United States Patent
Takimoto et al.

(10) Patent No.: US 12,477,224 B2
(45) Date of Patent: Nov. 18, 2025

(54) OPTICAL ELEMENT DRIVING APPARATUS, CAMERA MODULE AND CAMERA-EQUIPPED APPARATUS

(71) Applicants: Yukihiro Takimoto, Tokyo (JP); Masahiko Aranai, Tokyo (JP)

(72) Inventors: Yukihiro Takimoto, Tokyo (JP); Masahiko Aranai, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 182 days.

(21) Appl. No.: 18/331,426

(22) Filed: Jun. 8, 2023

(65) Prior Publication Data
US 2023/0403469 A1    Dec. 14, 2023

(30) Foreign Application Priority Data

Jun. 10, 2022 (JP) .................... 2022-094554
Feb. 3, 2023 (JP) .................... 2023-015247

(51) Int. Cl.
H04N 23/68 (2023.01)
H04N 23/54 (2023.01)
H04N 23/55 (2023.01)

(52) U.S. Cl.
CPC ........... *H04N 23/687* (2023.01); *H04N 23/54* (2023.01); *H04N 23/55* (2023.01)

(58) Field of Classification Search
USPC ........................................................ 396/55
See application file for complete search history.

(56) References Cited

U.S. PATENT DOCUMENTS

| | | | | |
|---|---|---|---|---|
| 7,355,630 B2 * | 4/2008 | Uenaka | .................. | H04N 23/68 348/208.7 |
| 8,027,579 B2 * | 9/2011 | Takizawa | ................. | G03B 5/00 396/55 |
| 8,521,017 B2 * | 8/2013 | Calvet | ..................... | G02B 7/04 310/309 |
| 8,649,672 B2 * | 2/2014 | Takizawa | ............... | H04N 23/60 396/55 |
| 2008/0219653 A1 * | 9/2008 | Shioda | ..................... | G03B 5/00 396/55 |
| 2011/0267692 A1 | 11/2011 | Watanabe | | |
| 2016/0274328 A1 | 9/2016 | Shin | | |

(Continued)

FOREIGN PATENT DOCUMENTS

| | | | | |
|---|---|---|---|---|
| CN | 110779641 A * | 2/2020 | ............ | G01L 3/104 |
| JP | 2012-118517 A | 6/2012 | | |

(Continued)

*Primary Examiner* — Walter L Lindsay, Jr.
*Assistant Examiner* — Warren K Fenwick
(74) *Attorney, Agent, or Firm* — Shih IP Law Group, PLLC

(57) ABSTRACT

An optical element driving apparatus includes: a coil and a magnet separately disposed at a movable part configured to hold an optical element and a fixing part configured to support the movable part, the coil and the magnet being configured to operate in conjunction with each other to move the movable part with respect to the fixing part; and a magnetic sensor configured to detect a position of the movable part based on a relative position with respect to the magnet. The magnetic sensor is mounted on a magnetic sensor substrate, the magnetic sensor substrate is housed in a recess provided in the fixing part.

15 Claims, 16 Drawing Sheets

(56) References Cited

U.S. PATENT DOCUMENTS

| | | |
|---|---|---|
| 2017/0123226 A1 | 5/2017 | Hu |
| 2017/0146769 A1 | 5/2017 | Huang |
| 2019/0101771 A1 | 4/2019 | Takimoto |
| 2022/0157503 A1 | 5/2022 | Saito |
| 2022/0269148 A1* | 8/2022 | Otsubo .................. H04N 23/57 |
| 2024/0176096 A1* | 5/2024 | Takimoto ............... H04N 23/54 |

FOREIGN PATENT DOCUMENTS

| | | |
|---|---|---|
| JP | 2014-186152 A | 10/2014 |
| JP | 2015-175879 A | 10/2015 |
| JP | 2016-180836 A | 10/2016 |
| JP | 2017-090902 A | 5/2017 |
| JP | 2017-099273 A | 6/2017 |
| JP | 2018-106168 A | 7/2018 |
| JP | 2019-066568 A | 4/2019 |
| JP | 2021-096337 A | 6/2021 |
| JP | 2023-114905 A | 8/2023 |
| WO | 2010082555 | 7/2010 |
| WO | 2020189478 A1 | 9/2020 |

* cited by examiner

OPTICAL ELEMENT DRIVING APPARATUS, CAMERA MODULE AND CAMERA-EQUIPPED APPARATUS

CROSS REFERENCE TO RELATED APPLICATIONS

This application is entitled to or claims the benefit of Japanese Patent Application Nos. 2022-094554, filed on Jun. 10, 2022, and 2023-015247, filed on Feb. 3, 2023, the disclosures of which including the specification, drawings and abstract are incorporated herein by reference in their entirety.

TECHNICAL FIELD

The present invention relates to an optical element driving apparatus, a camera module, and a camera-equipped apparatus.

BACKGROUND ART

In general, a mobile terminal such as a smartphone is equipped with a small-sized camera module. For such a camera module, an optical element driving apparatus for driving the optical element is used.

The optical element driving apparatus has an auto focus function (hereinafter referred to as "AF function", AF: Auto Focus) and a shake correction function (hereinafter referred to as "OIS function", OIS: Optical Image Stabilization). The optical element driving apparatus automatically performs focusing when capturing a subject with the AF function, and reduces image distortion by optically correcting the runout (vibration) that is caused upon capturing an image with the OIS function.

PTL 1 discloses an optical element driving apparatus having the AF function and the OIS function, for example. The optical element driving apparatus disclosed in PTL 1 includes a lens holder capable of holding the lens, a first driving part including a coil and a magnet and configured to move the lens holder in the optical axis direction (optical axis direction), and a second driving part configured to move the lens holder in the direction intersecting the optical axis direction (optical axis orthogonal direction).

The optical element driving apparatus disclosed in PTL 1 is provided with a Hall element that detects the position of the lens holder by detecting a change of the magnetic flux of the opposite magnets. This Hall element is disposed at a position aligned with the coil at the outer periphery part of the lens holder in the state where it is mounted on a flexible printed circuit (FPC).

In addition, as an example of the optical element driving apparatus in which the Hall element for the lens holder position detection, one disclosed in disclosed in PTL 2 is known, for example. PTL 2 proposes a configuration in which the Hall element is directly fit into the recess of the fixing part without being mounted on the substrate for the purpose of solving upsizing due to the Hall element mounted to the FPC, the influence of the external shape accuracy and mounting accuracy of the FPC on the Hall element attaching accuracy, the poor handleability due to the Hall element mounted on the FPC, and the like. In the fixing part, the wiring member is insert molded, and the Hall element is electrically connected to the circuit board holding the imaging element through the wiring member.

CITATION LIST

Patent Literature

PTL 1
Japanese Patent Application Laid-Open No. 2016-180836
PTL 2
Japanese Patent Application Laid-Open No. 2015-175879
PTL 3
Japanese Patent Application Laid-Open No. 2019-66568

SUMMARY OF INVENTION

Technical Problem

However, even by employing the configuration in which the Hall element is installed without mounting it on the substrate as in the optical element driving apparatus disclosed in PTL 2, the Hall element attaching accuracy is eventually affected by the molding accuracy of the insert molding of the wiring member, the formation accuracy of the recess in the fixing part, and the fitting accuracy of the Hall element to the recess. Therefore, it can be said that avoiding the use of mounting boards would not necessarily improve the Hall element attaching accuracy. In addition, the configuration in which the Hall element is fit into a small recess makes it difficult to confirm the mounting state of the Hall element and the connection state with the wiring member, and rather may not improve the Hall element attaching accuracy.

An object of the present invention is to provide an optical element driving apparatus, a camera module and a camera-equipped apparatus that can improve the attaching accuracy of the movable part detection magnetic sensor while suppressing the increase of the apparatus size.

Solution to Problem

An optical element driving apparatus according to the present invention includes: a coil and a magnet separately disposed at a movable part configured to hold an optical element and a fixing part configured to support the movable part, the coil and the magnet being configured to operate in conjunction with each other to move the movable part with respect to the fixing part; and a magnetic sensor configured to detect a position of the movable part based on a relative position with respect to the magnet. The magnetic sensor is mounted on a magnetic sensor substrate, the magnetic sensor substrate is housed in a recess provided in the fixing part.

A camera module according to the present invention includes: the optical element driving apparatus; the optical element; and an image-capturing part configured to capture a subject image formed by the optical element.

A camera-equipped apparatus according to the present invention is an information apparatus or a transport apparatus, the camera-equipped apparatus including: the camera module; and an image processing part configured to process image information obtained by the camera module.

Advantageous Effects of Invention

According to the present invention, it is possible to improve the attaching accuracy of the movable part detection magnetic sensor while suppressing the increase of the size of the optical element driving apparatus.

DESCRIPTION OF EMBODIMENTS

An embodiment of the present invention is elaborated below with reference to the accompanying drawings.

Configuration of Camera-Equipped Apparatus

First, a camera-equipped apparatus to which a camera module according to the present embodiment is applied is described.

Figure 1A:
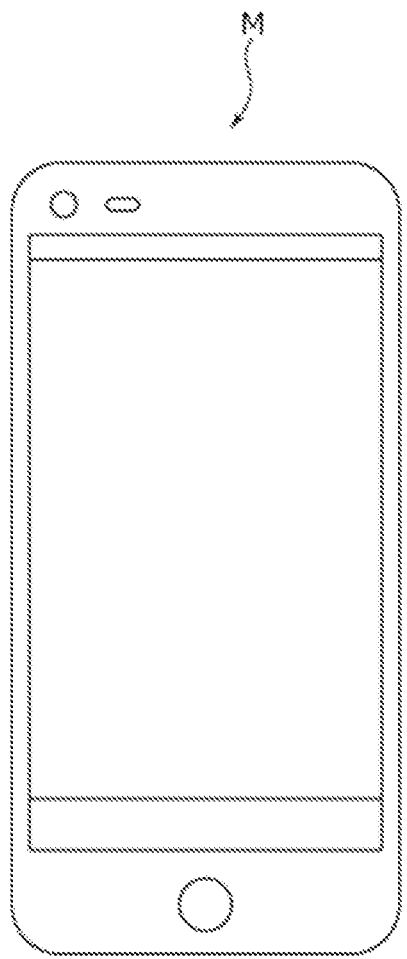
FIG. 1A is a front view illustrating an example of a camera-equipped apparatus equipped with a camera module according to an embodiment of the present invention.
Figure 1B:
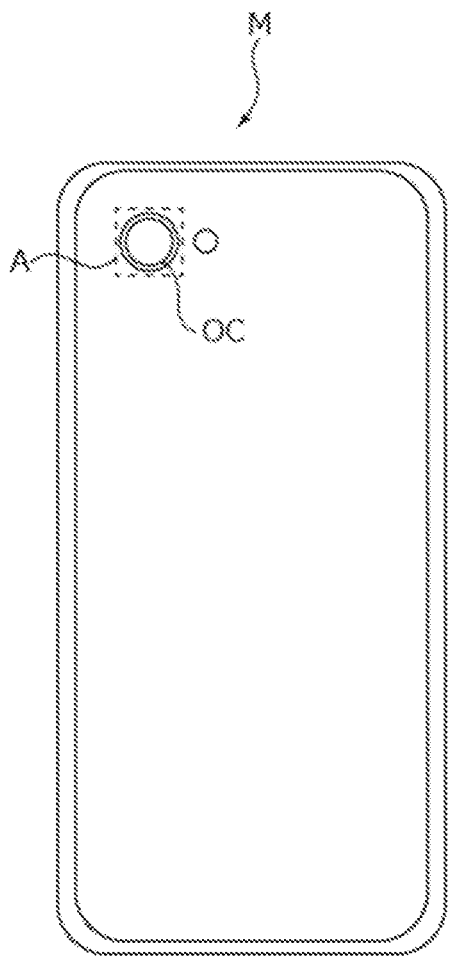
FIG. 1B is a rear view illustrating an example of the camera-equipped apparatus.

FIGS. 1A and 1B illustrate smartphone M (an example of the camera-equipped apparatus) equipped with camera module A according to the present embodiment. FIG. 1A is a front view of smartphone M and FIG. 1B is a rear view of smartphone M. Smartphone M includes one or more back surface cameras OC, and camera module A is applied to back surface camera OC. Camera module A has an AF function and an OIS function, and can automatically perform focusing when capturing a subject and capture an image with no image blurring by optically correcting runout (vibration) caused when capturing an image.

Figure 2A:
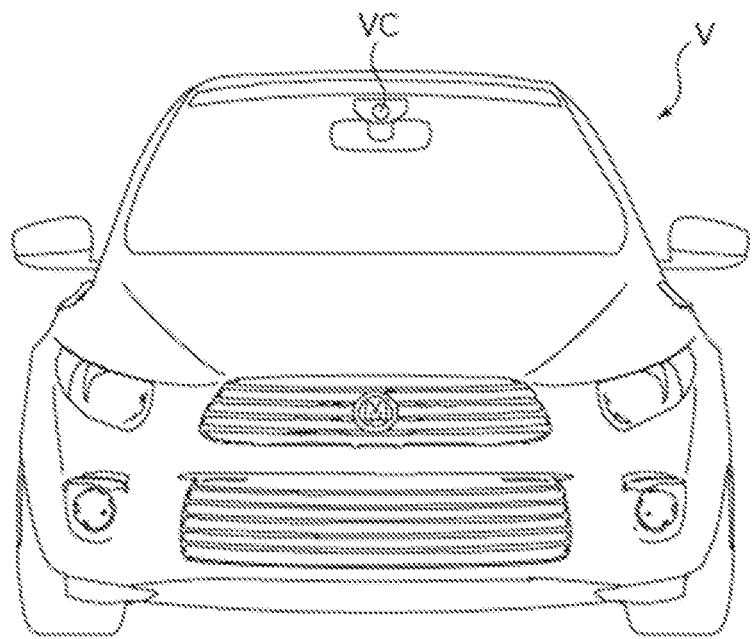
FIG. 2A is a front view illustrating another example of the camera-equipped apparatus equipped with the camera module according to the present embodiment.
Figure 2B:
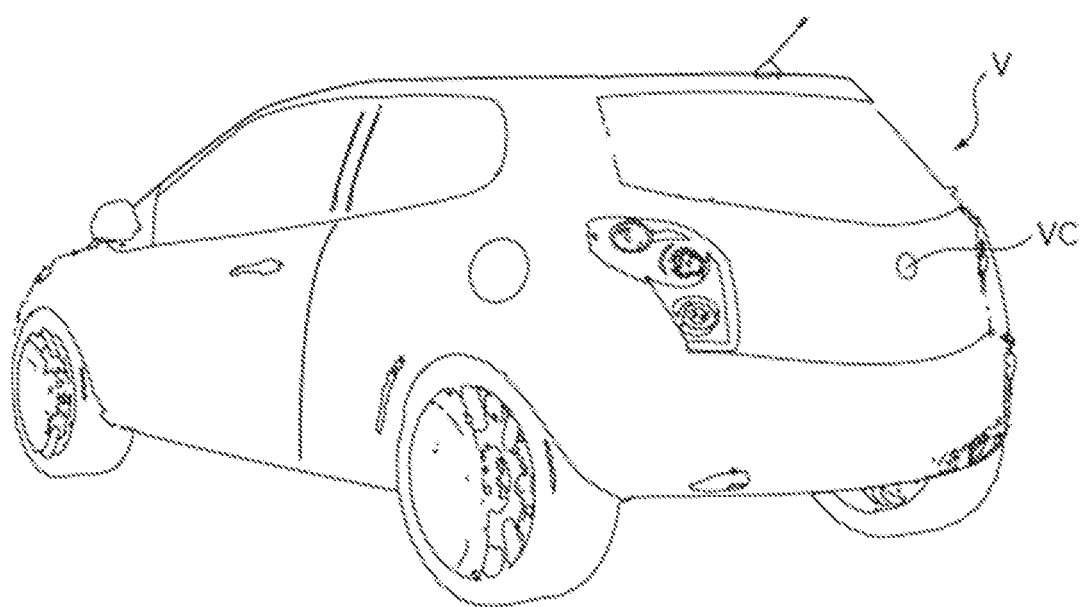
FIG. 2B is a perspective view of another example of the camera-equipped apparatus.

FIGS. 2A and 2B illustrate automobile V (another example of the camera-equipped apparatus) equipped with in-vehicle camera module VC (Vehicle Camera). FIG. 2A is a front view of automobile V, and FIG. 2B is a rear perspective view of automobile V. As illustrated in FIGS. 2A and 2B, in-vehicle camera module VC is attached to a windshield to face forward, and attached to a rear gate to face rearward, for example. This in-vehicle camera module VC is used for the rear-view monitor, the drive recorder, the collision-avoidance control, the automated driving control and the like. Camera module A is applied to in-vehicle camera module VC of automobile V.

The present embodiment describes an example in which camera module A is applied to smartphone M, but camera module A is applicable to various camera-equipped apparatuses that include camera module A and an image processing part that processes the image information obtained by camera module A. For example, the camera-equipped apparatus includes various information apparatuses and transport apparatuses. The information apparatus includes camera-equipped mobile phones, note-type personal computers, tablet terminals, mobile game machines, web-cameras, camera-equipped in-vehicle apparatuses (such as rear-view monitor apparatuses, and drive recorder apparatuses), drones and the like, for example. In addition, the transport apparatuses include automobiles, drones and the like.

Configuration of Camera Module

Next, a schematic configuration of camera module A is described. Note that in the description of the present embodiment, an orthogonal coordinate system (X, Y, Z) is used. Note that in the present embodiment, the intermediate direction of the X direction and the Y direction in the XY plane is the U direction and the V direction (see FIGS. 12 and 13). For example, the U direction and the V direction are diagonal directions in the plan shape of camera module A, which is square in the present embodiment. Note that the expressions related to the shape used in the description of the present embodiment are expressions for convenience of schematic description, and naturally the definition of a geometrically accurate drawings does not always apply.

Figure 3:
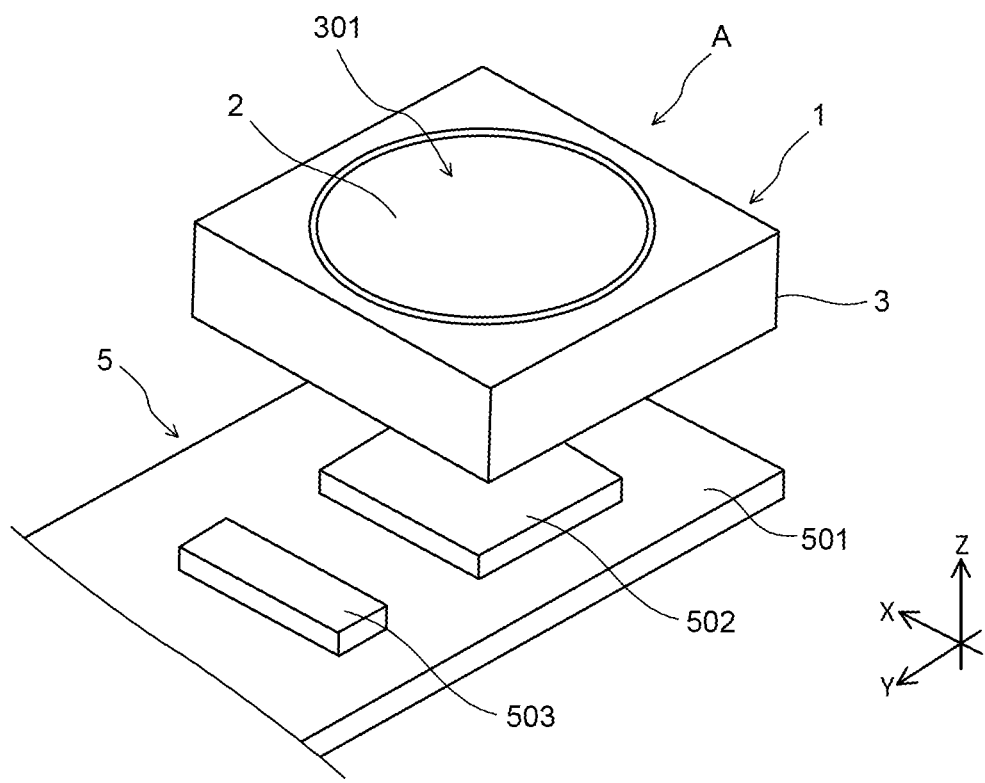
FIG. 3 is a perspective view schematically illustrating a configuration of the camera module according to the present embodiment.

FIG. 3 is a perspective view schematically illustrating a configuration of camera module A. Camera module A is mounted such that the X direction is aligned with the up-down direction (or the left-right direction), the Y direction to the left-right direction (or the up-down direction), and the Z direction to the front-rear direction when an image is captured with smartphone M, for example. Specifically, the Z direction is the optical path direction, and, in FIG. 3, the upper side (+Z side) is the light reception side (also referred to as macro position side) in the optical path direction, and the lower side (−Z side) is the imaging side (also referred to as infinity position side) in the optical path direction. The direction orthogonal to the Z direction is the optical path orthogonal direction, and the X direction and the Y direction are examples of the optical path orthogonal direction.

Here, the optical path is the route of light formed by opening 301 of cover 3 described later, lens housing opening 110a1 that houses lens part 2 in AF movable part 11 described later, or center opening 250 facing imaging element 502 in OIS fixing part 20 described later (see FIG. 4). The extending direction of the optical path (the penetration direction of each opening) is the optical path direction. The optical path direction may be referred to as other names such as optical axis direction and focal point direction (focal point adjusting direction) depending on the type of the optical element and the like. In addition, the optical path orthogonal direction may be referred to as optical axis orthogonal direction, shake correction direction and the like, and the XY plane may be referred to as optical axis orthogonal plane, shake correction surface and the like.

In addition, in the following description, the "radial direction", "radially" and "radial" mean the direction radially or centrifugally extending with the optical path or optical axis at the center, and the "circumferential direction" means the direction extending around the optical path or the optical axis unless otherwise noted. In addition, the "outside" means the outside in the radial direction about the optical path or the optical axis, and the "inside" means the inside in the radial direction about the optical path or the optical axis unless otherwise noted.

In addition, in the following description, the four corners of the plan shape (in the present embodiment, a square shape) of camera module A may be specified by discriminating from each other. In this case, for convenience, the corner part on the +side in the X direction and the +side in the Y direction is referred to as first corner part, the corner part on the −side in the X direction and the +side in the Y direction to second corner part, the corner part on the −side in the X direction and the −side in the Y direction to third corner part, and the corner part on the +side in the X direction and the −side in the Y direction to fourth corner part.

As illustrated in FIG. 3, camera module A includes optical element driving apparatus 1 for implementing the AF function and the OIS function, lens part 2 (an example of the optical element) composed of a lens housed in a cylindrical lens barrel, and image-capturing part 5 that captures the subject image formed by lens part 2.

Optical element driving apparatus 1 is covered with cover 3 on the outside. Cover 3 is a rectangular capped cylinder member with a square shape in plan view as viewed from the Z direction. In the present embodiment, cover 3 has a square shape in plan view. Cover 3 includes opening 301 with a substantially semicircular shape at the top surface (the surface on the +side in the Z direction). Lens part 2 faces outside from opening 301 of cover 3. Cover 3 is fixed by bonding to base member 25 of OIS fixing part 20 of optical element driving apparatus 1. Cover 3 is composed of a magnetic substance to function as a shielding member for blocking the electromagnetic waves from the outside of optical element driving apparatus 1, and preventing the magnetic interaction between inside and outside of optical element driving apparatus 1, for example.

Image-capturing part 5 is disposed on the imaging side (the −side in the Z direction) of optical element driving apparatus 1. Image-capturing part 5 includes image sensor substrate 501, and imaging element 502 and control part 503 mounted on image sensor substrate 501, for example. Imaging element 502 is composed of a CCD (charge-coupled device) image sensor, a CMOS (complementary metal oxide semiconductor) image sensor or the like, and captures the subject image formed by lens part 2, for example. Optical element driving apparatus 1 is mounted on image sensor substrate 501 and electrically connected to image sensor substrate 501.

Control part 503 is composed of a control IC (Integrated Circuit), and drives and controls optical element driving apparatus 1, for example. Control part 503 may be provided in image sensor substrate 501, or in the camera-equipped apparatus (in the present embodiment, smartphone M) in which camera module A is mounted.

Note that in the present embodiment, lens part 2 is configured to be movable in the optical axis direction and optical axis orthogonal direction in optical element driving apparatus 1 with respect to image sensor substrate 501 of which the position is fixed, but it is possible to adopt a configuration in which object lens part 2 is fixed (to be unmovable) while imaging element 502 is allowed to move (movable) in at least one of the optical axis direction and the optical axis orthogonal direction for the purpose of focusing or shake correction. In this case, imaging element 502 is an example of the optical element held by the AF movable part or the OIS movable part.

Configuration of Optical Element Driving Apparatus

Next, a configuration of optical element driving apparatus 1 is described with reference to FIGS. 4 to 11. Note that in the description of the configuration of optical element driving apparatus 1, the +side in the Z direction is "upper side", and the −side in the Z direction is "lower side" for convenience.

Figure 4:
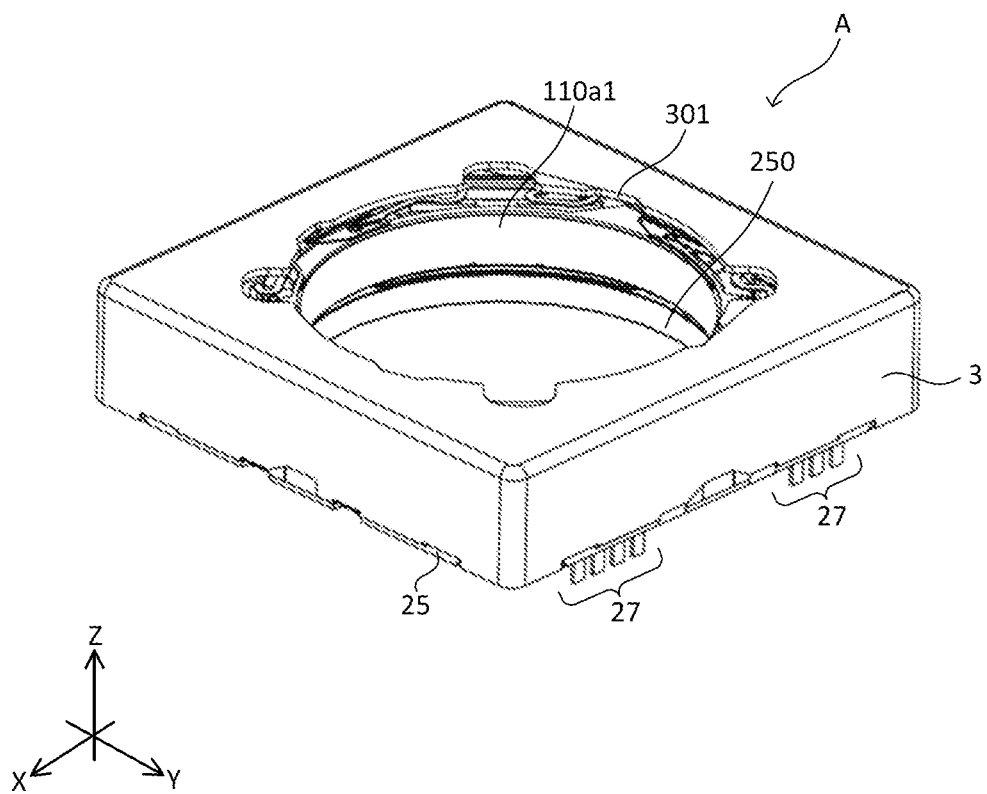
FIG. 4 is a perspective view illustrating an external appearance of an optical element driving apparatus of the camera module according to the present embodiment.
Figure 5:
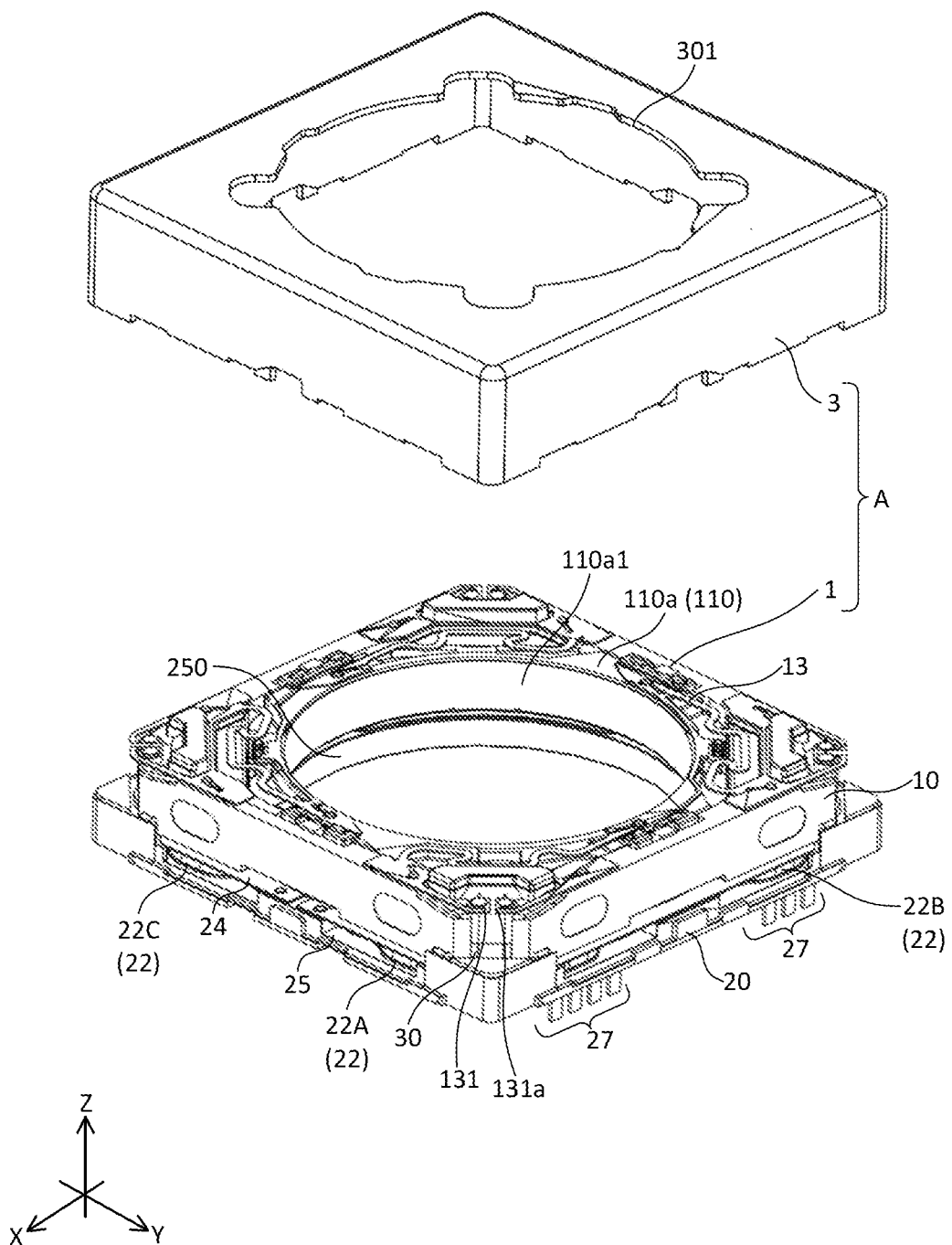
FIG. 5 is an exploded perspective view illustrating a state where a cover is detached from the optical element driving apparatus in the camera module according to the present embodiment as viewed from above.
Figure 6:
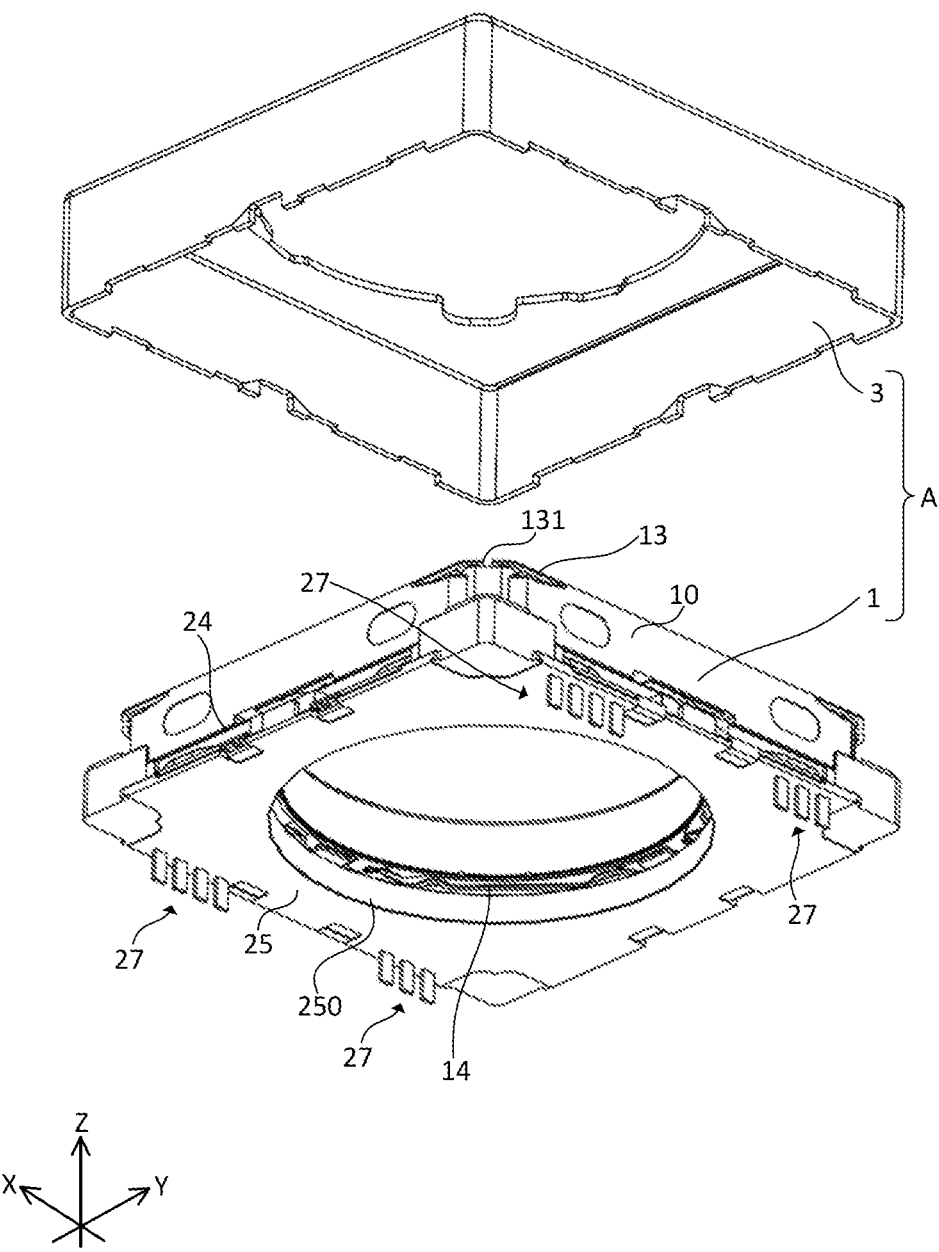
FIG. 6 is an exploded perspective view illustrating the state illustrated in FIG. 5 as viewed below.
Figure 7:
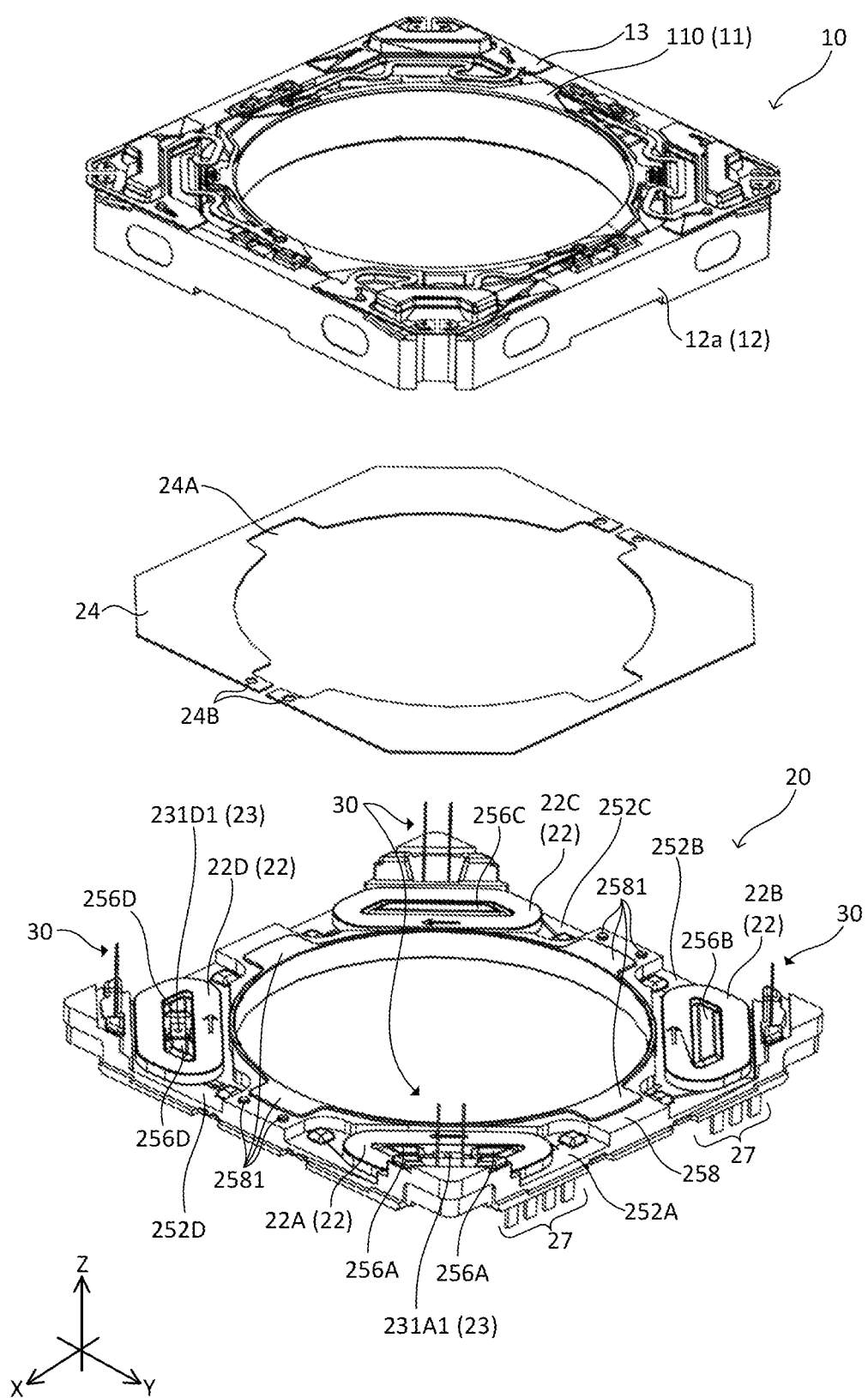
FIG. 7 is an exploded perspective view illustrating a state where an OIS movable part is detached from an OIS fixing part in the optical element driving apparatus illustrated in FIG. 5 as viewed from above.
Figure 8:
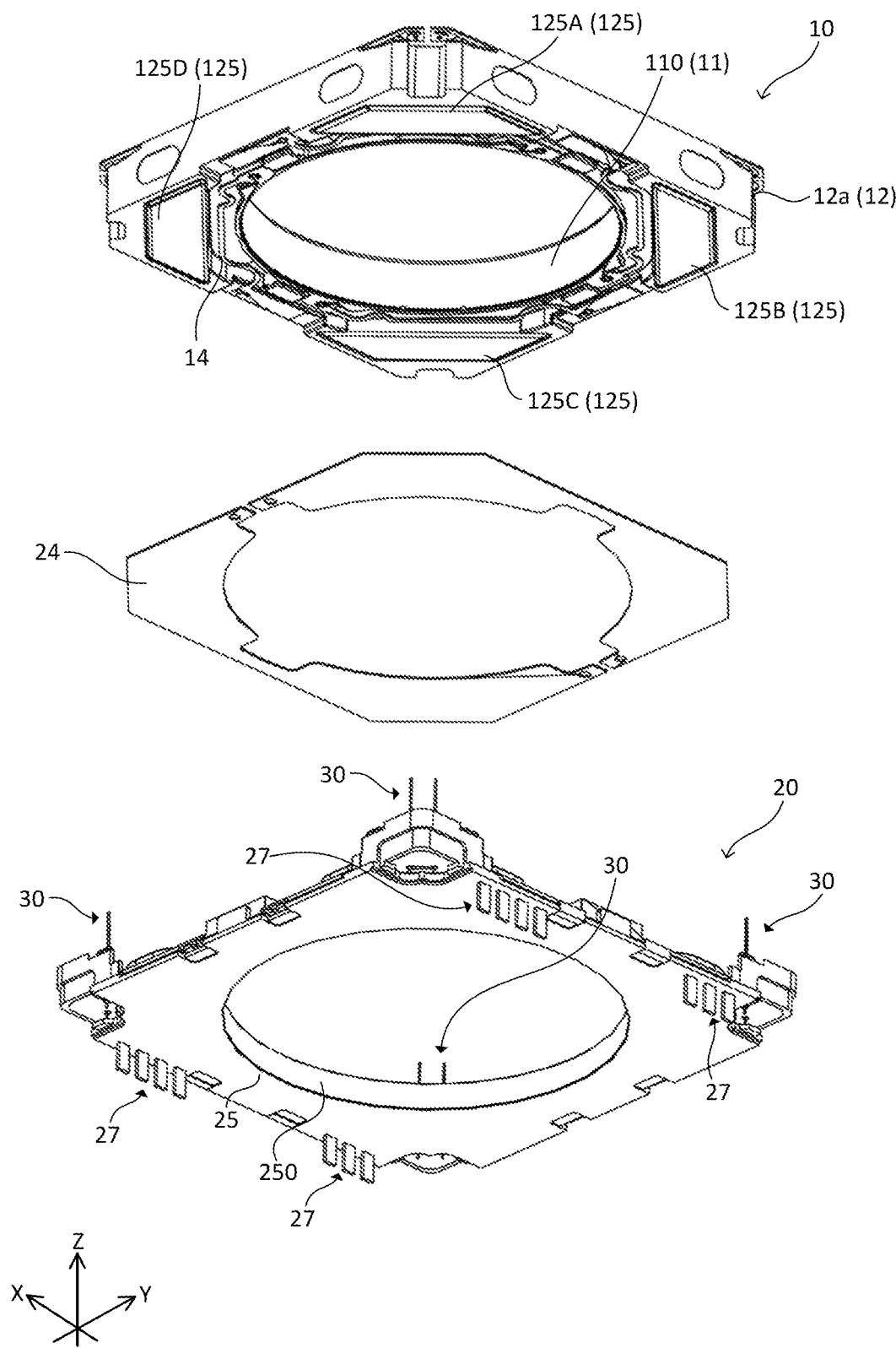
FIG. 8 is an exploded perspective view illustrating the state illustrated in FIG. 7 as viewed below.
Figure 9:
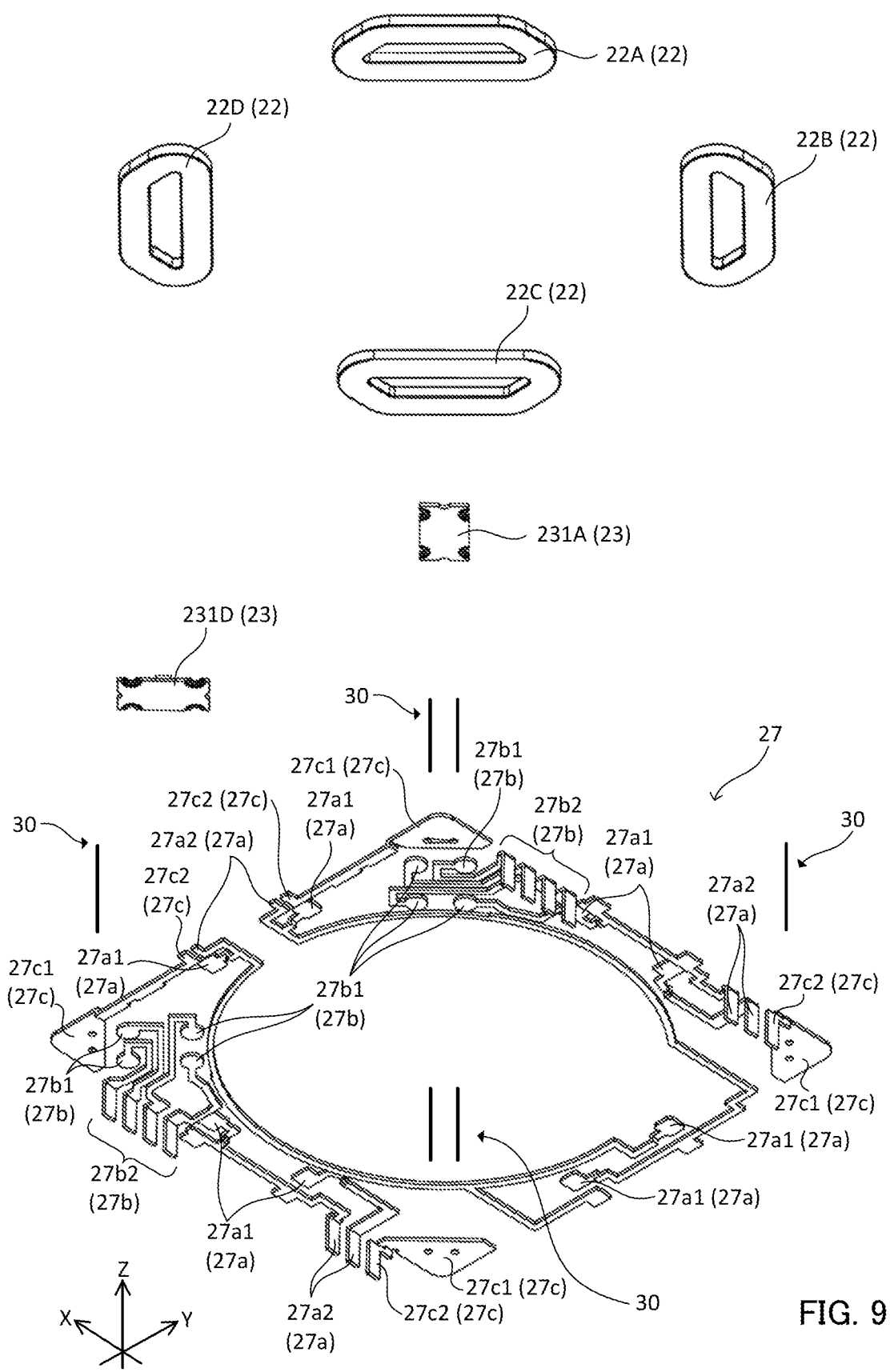
FIG. 9 is a diagram for describing a wiring in the OIS fixing part illustrated in FIG. 7.
Figure 10:
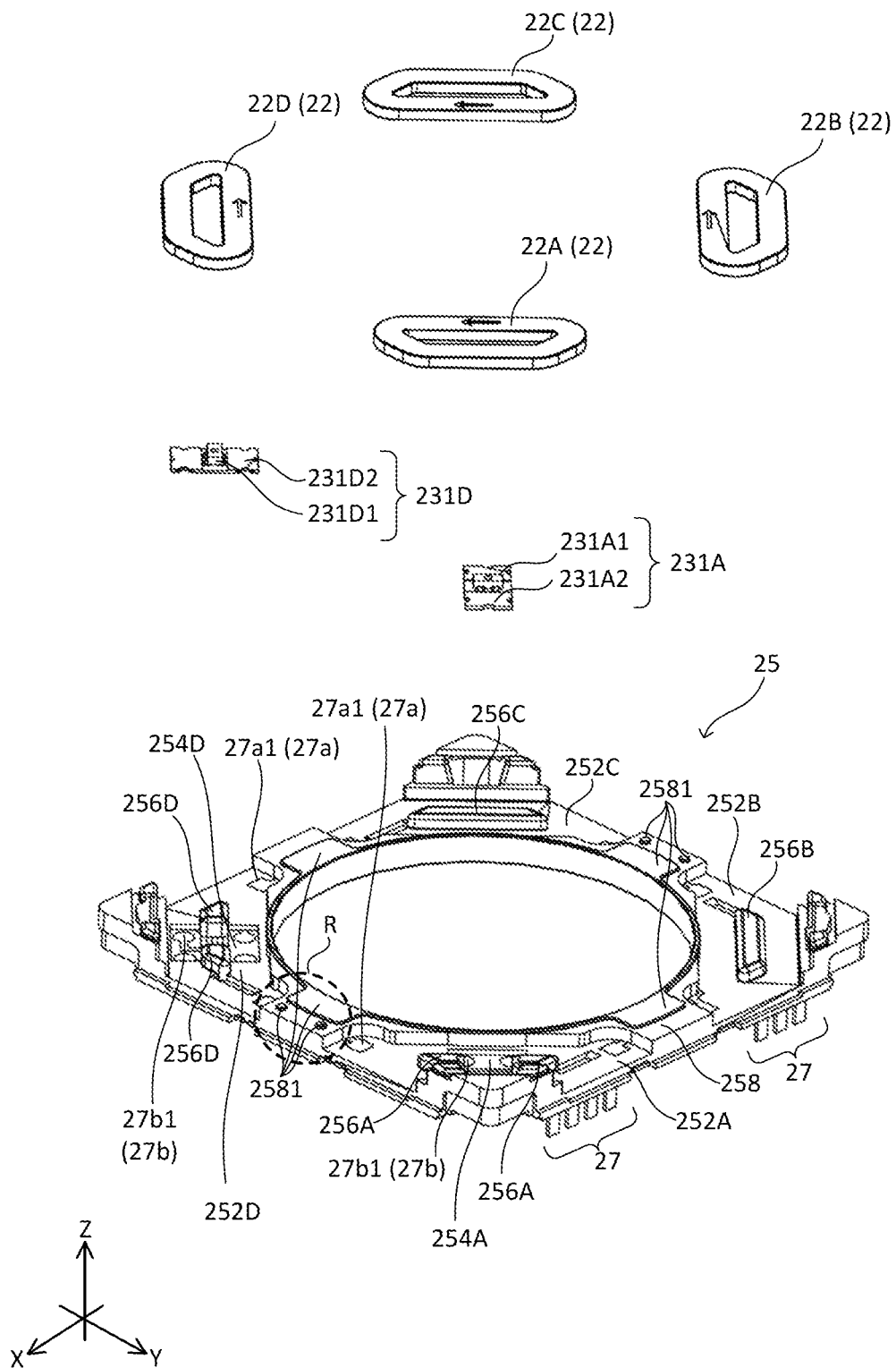
FIG. 10 is an exploded perspective view illustrating a state where a Hall element chip assembly and an OIS coil are detached from a base member in the OIS fixing part illustrated in FIG. 7 as viewed from above.
Figure 11A:
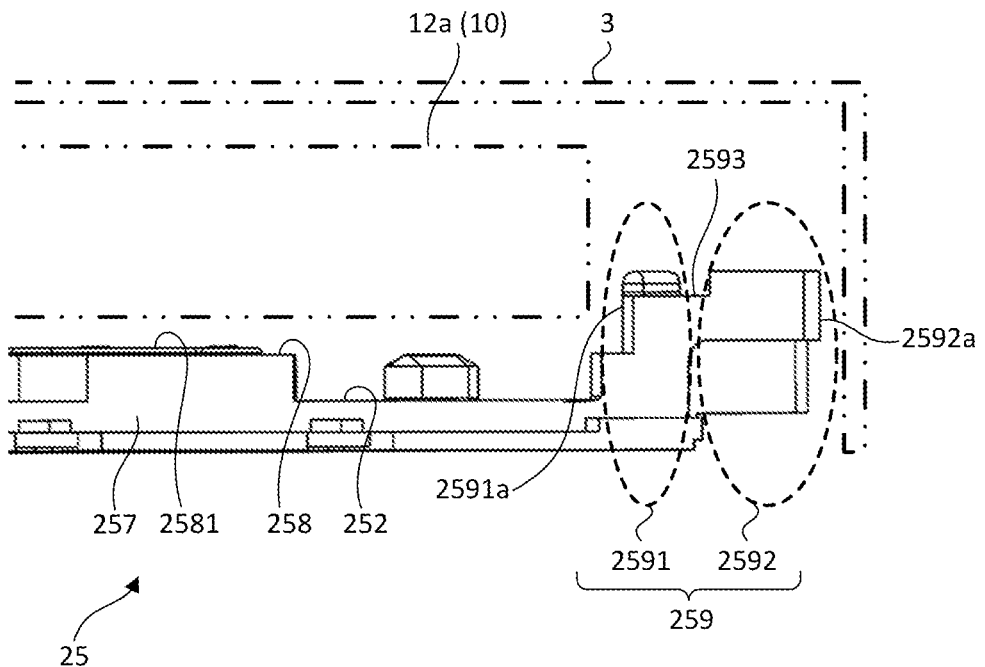
FIG. 11A is a side view for describing a structure of a four-corner column part of the base member in the optical element driving apparatus illustrated in FIG. 5.
Figure 11B:
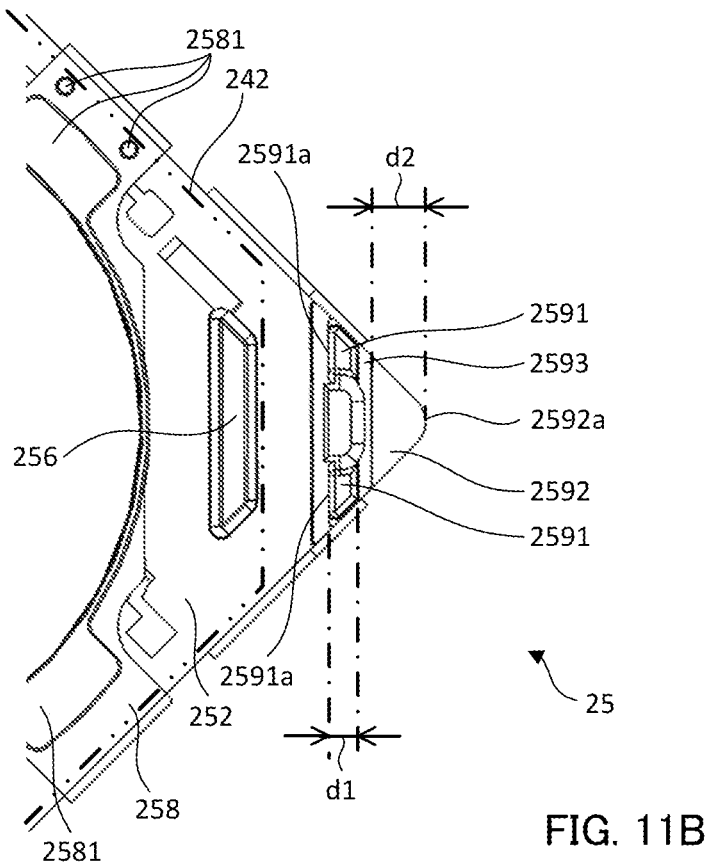
FIG. 11B is a plan view for describing a structure of the four-corner column part of the base member in the optical element driving apparatus illustrated in FIG. 5.

FIG. 4 is a perspective view illustrating an external appearance of optical element driving apparatus 1. FIGS. 5 and 6 are exploded perspective views illustrating a state where cover 3 is detached from optical element driving apparatus 1 as viewed from above and below. FIGS. 7 and 8 are exploded perspective views illustrating a state where OIS movable part 10 is detached from OIS fixing part 20 in optical element driving apparatus 1 as viewed from above and below. FIG. 9 is a diagram for describing a wiring in OIS fixing part 20. FIG. 10 is an exploded perspective view illustrating a state where Hall element chip assemblies 231A and 231D and OIS coils 22A to 22D are detached from base member 25 in OIS fixing part 20 as viewed from above. FIGS. 11A and 11B are a side view and a plan view for describing a structure of four-corner column part 259 of base member 25 in optical element driving apparatus 1.

Optical element driving apparatus 1 includes OIS movable part 10, OIS fixing part 20, and OIS supporting part 30.

OIS movable part 10 is a part including an OIS magnet part making up the OIS voice coil motor, which is an example of an OIS driving part, and configured to sway in the optical axis orthogonal plane during shake correction. OIS fixing part 20 is a part including an OIS coil part. Specifically, a moving magnet system is employed for the OIS driving part of optical element driving apparatus 1. OIS movable part 10 is also "AF unit" including the AF driving part.

OIS movable part 10 is disposed separately from OIS fixing part 20 on the +side in the Z direction (the upper side or the light reception side in the optical axis direction) over OIS fixing part 20, and is coupled with OIS fixing part 20 through OIS supporting part 30.

OIS Supporting Part OIS supporting part 30 is composed of a plurality of suspension wires extending along the Z direction (hereinafter referred to as "suspension wire 30" instead of "OIS supporting part 30"). One end (lower end)

of each suspension wire 30 is fixed to OIS fixing part 20, and the other end (upper end) of each suspension wire 30 is fixed to OIS movable part 10 (more specifically, upper elastic support part 13). OIS movable part 10 is supported by suspension wire 30 such that OIS movable part 10 is swayable in the optical axis orthogonal plane.

In the present embodiment, a pair of suspension wires 30 is disposed at each of the four corners. With such an arrangement, the OIS movable part with the same weight can be supported even when the spring constant of the each wire is reduced (or in other words, even when the flexibility is increased) in comparison with the case where one wire is disposed at each of the four corners. In this manner, both the stability in the support performance and the sway performance of the shake correction can be achieved. In addition, the durability can be improved because it makes difficult for the stress to concentrate on each suspension wire 30.

All or selected suspension wires 30 disposed at the four corners are used as power feeding paths to AF coil part 111. Note that the number of suspension wires 30 is not limited to eight, and the number may be smaller than eight or greater than eight as long as the performance of supporting OIS movable part 10 in a swayable manner is maintained. In addition, the configuration of the OIS supporting part is not limited to linear members such as the suspension wire, and may have a configuration in which OIS movable part 10 is supported in a swayable manner with a frame body composed of a resin material such as elastomer as the preform (base material). In addition, suspension wire 30 is a member formed of a metal material for the purpose of power feeding and signal transmission in the present embodiment, but suspension wire 30 is not necessarily formed of a metal material when the means for power feeding and signal transmission can be separately ensured.

OIS Movable Part

OIS movable part 10 (also referred to as AF unit) includes AF movable part 11, AF fixing part 12, and the AF supporting part (upper elastic support part 13 and lower elastic support part 14).

AF Movable Part

AF movable part 11 is disposed separately on the inside of AF fixing part 12 in the radial direction, and is coupled with AF fixing part 12 with upper elastic support part 13 and lower elastic support part 14.

AF movable part 11 is a part including a coil part making up the AF voice coil motor, which is an example of the AF driving part, and configured to move in the Z direction (optical axis direction) with respect to AF fixing part 12 at the time of focusing. AF fixing part 12 is a part that includes the magnet part making up the AF voice coil motor. Specifically, a moving coil system is employed for the AF driving part of optical element driving apparatus 1.

AF movable part 11 includes lens holder 110 and AF coil part 111.

Lens holder 110 includes cylindrical lens housing part 110a. Lens part 2 is fixed by bonding to the inner peripheral surface of opening (lens housing opening) 110a1 of lens housing part 110a, for example. Note that the method of fixing lens part 2 to lens holder 110 is not limited to bonding, and other methods may be employed.

Lens holder 110 is formed of a molding material composed of a PAR alloy (such as PAR/PC), which is a mixture of a plurality of resin materials including polyarylate (PAR) or PAR, for example. In this manner, the weld strength is higher than a known molding material such as liquid crystal polymer (LCP), and thus the toughness and impact resistance can be ensured even when lens holder 110 is thinned.

In this manner, the size of the external shape of optical element driving apparatus 1 can be reduced, and thus the size and weight can be reduced.

Lens holder 110 includes an upper flange and a lower flange (not illustrated) protruding radially outside from the upper part and lower part of the outer peripheral surface of lens housing part 110a, and a groove that is continuous over the whole circumference is provided between the upper flange and lower flange at the outer peripheral surface. That is, lens holder 110 has a bobbin structure. AF coil part 111 is disposed at the groove in the outer peripheral surface of lens holder 110.

AF coil part 111 is a coil that is energized at the time of focusing. The both ends of AF coil part 111 is tied to a tying part (not illustrated) provided in lens holder 110.

For the specific configuration of AF movable part 11, publicly known techniques disclosed in PTL 3 and the like may be employed as necessary, and therefore the description thereof is omitted here, for example.

AF Fixing Part

AF fixing part 12 supports AF movable part 11 with the AF supporting part such that movable part 11 is movable in the optical axis direction. AF fixing part 12 includes magnet holder 12a and magnet part 125.

Magnet holder 12a has a rectangular cylindrical shape with a square shape in plan view from the Z direction, and includes a magnet installation part for disposing magnet part 125 at portions corresponding to the four corners of the inner peripheral surface. The inner hollow part defined by magnet part 125 mounted to the magnet installation part and magnet holder 12a makes up a lens holder housing opening for housing AF movable part 11.

A groove recessed inward in the radial direction is formed at each of the four corners at the outer peripheral surface of magnet holder 12a, and suspension wire 30 is disposed in each groove. A damper material (such as silicone gel) may be disposed in this groove, and the damper material can stabilize the operation of the OIS by suppressing the generation of the unnecessary resonance (high-order resonance mode).

In magnet holder 12a, lower elastic support part 14 is fixed to the end surface (rear surface) on the −side in the Z direction, and upper elastic support part 13 is fixed to the surface (front surface) on the +side in the Z direction.

In the present embodiment, as with lens holder 110, magnet holder 12a is formed of a molding material composed of a PAR alloy (such as PAR/PC), which is a mixture of a plurality of resin materials including polyarylate (PAR) or PAR. In this manner, the weld strength is increased and thus toughness and impact resistance can be ensured even when magnet holder 12a is thinned. Thus, the size of the external shape of optical element driving apparatus 1 can be reduced, and downsizing and height reduction can be achieved.

Magnet part 125 includes four rectangular columnar permanent magnets 125A to 125D (an example of the magnet). Permanent magnets 125A to 125D are fixed by bonding to the magnet installation part, for example. In the present embodiment, each of permanent magnets 125A to 125D has a substantially isosceles trapezoidal shape in plan view.

Figure 12:
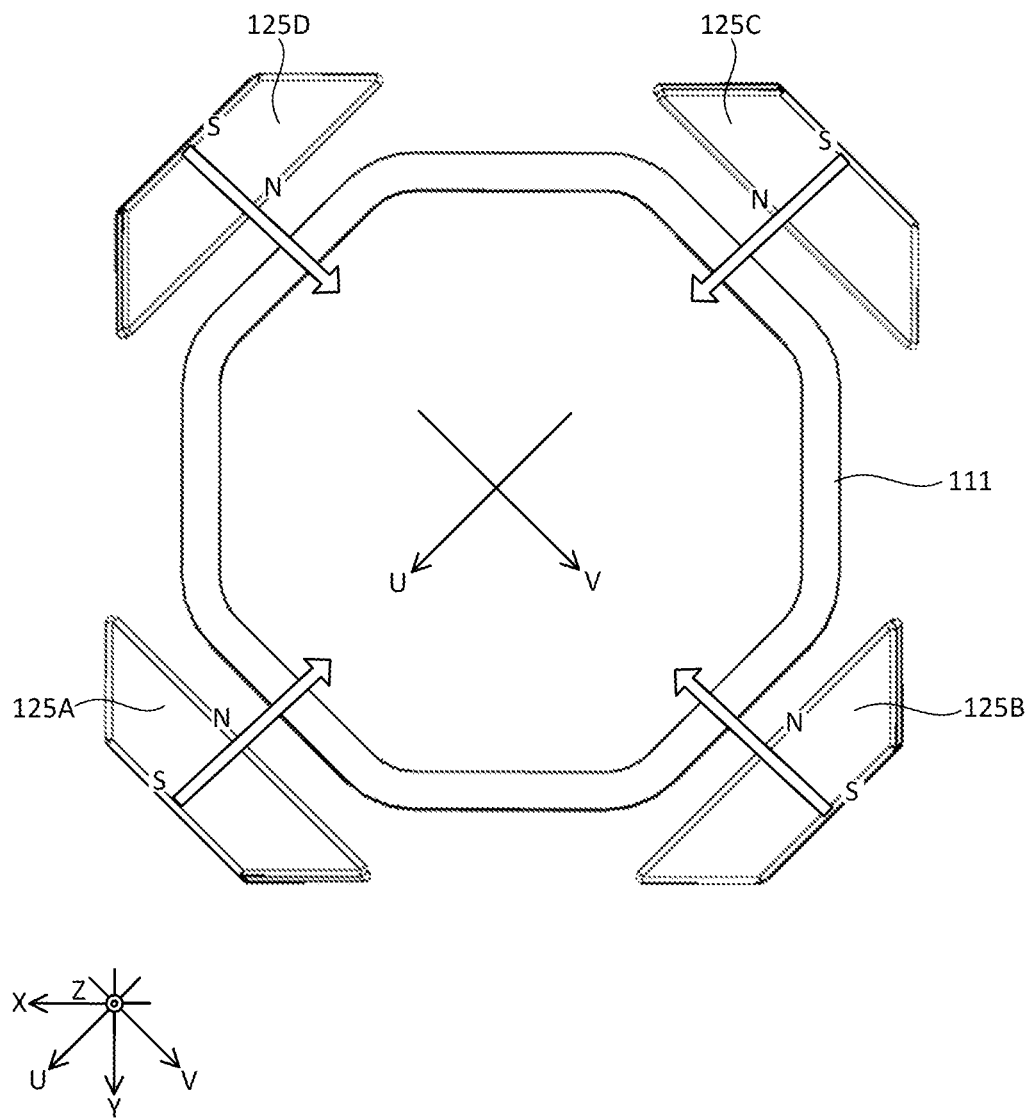
FIG. 12 is a diagram for describing a driving principle of an AF driving part in the optical element driving apparatus illustrated in FIG. 5.

In this manner, the space of the corner portion (more specifically magnet installation part) of magnet holder 12a can be effectively used. Permanent magnets 125A to 125D are magnetized so as to form the magnetic field crossing AF coil part 111 in the radial direction as illustrated in FIG. 12, and crossing OIS coil part 22 in the optical axis direction as is clear from FIG. 13. In the present embodiment, permanent magnets 125A to 125D are magnetized to N pole on the inner circumference side and S pole on the outer circumference side.

The end surface (rear surface) on the −side in the Z direction of permanent magnets 125A to 125D protrudes to the −side in the Z direction than magnet holder 12a. That is, the height of OIS movable part 10 is defined by permanent magnets 125A to 125D. In this manner, the height of OIS movable part 10 can be suppressed to a minimize size in accordance with the size of permanent magnets 125A to 125D for ensuring the magnetic force, and thus the height of optical element driving apparatus 1 can be reduced.

With magnet part 125 and AF coil part 111 as described above, the AF voice coil motor (AF driving part) is configured. In addition, magnet part 125 is shared by the AF magnet part and the OIS magnet part.

For the specific configuration of AF fixing part 12, the publicly known technique disclosed in PTL 3 and the like may be employed as necessary, and therefore the description thereof is omitted here, for example.

AF Supporting Part

The AF supporting part elastically supports AF movable part 11 with respect to AF fixing part 12. In the present embodiment, the AF supporting part includes upper elastic support part 13 and lower elastic support part 14. The present embodiment describes an example case where each of upper elastic support part 13 and lower elastic support part 14 is a leaf spring. In view of this, in the following description, "upper leaf spring 13" and "lower leaf spring 14" are described instead of "upper elastic support part 13" and "lower elastic support part 14". The leaf spring is composed of a beryllium copper, a nickel copper, or a stainless-steel.

Upper leaf spring 13 is fixed to the surface (front surface) of magnet holder 12a on the +side in the Z direction on the outside, and fixed to the surface (front surface) of lens holder 110 on the +side in the Z direction on the inside. In upper leaf spring 13, the arm part extending in the intermediate part between the outside and inside is elastically-deformable, and thus the inner portion of upper leaf spring 13 is relatively displaceable in the Z direction with respect to the outer portion of upper leaf spring 13.

Upper leaf spring 13 includes an outer extension part extending on the outside of the outer portion fixed to the front surface of magnet holder 12a. The outer extension part is disposed on the +side in the Z direction of the groove where suspension wire 30 is disposed in magnet holder 12a. The outer extension part is wire fixing part 131 where the upper end of suspension wire 30 is fixed by soldering.

Note that at the four corners, a pair of wire fixing parts 131 where two suspension wires 30 adjacent to each other are fixed may be connected and integrated between two suspension wires 30 adjacent to each other, or may be independently separated from each other with slit 131a between two suspension wires 30 adjacent to each other.

In the case where the pair of wire fixing parts 131 is integrated, if one wire fixing part 131 and one suspension wire 30 are joined by soldering and then the other wire fixing part 131 and the other suspension wire 30 and joined by soldering, the heat transmits through the previously joined solder through the connection of the pair of wire fixing parts 131, and failures that cause re-melting and, in turn, separation of the joined portion may possibly occur. In addition, a failure in which the vibration behaviors of two suspension wires 30 adjacent to each other affect each other may possibly occur. On the other hand, the possibility of the occurrence of the above-described failures may be reduced by separately and independently providing the pair of wire fixing parts 131 by means of slit 131a, for example.

Upper leaf spring 13 is separated into a feeding path portion connected to suspension wire 30 used as a power feeding path to the AF control part (not illustrated), and a signal path portion connected to suspension wire 30 used as a signal path for transmitting a control signal to the AF control part (not illustrated). Upper leaf spring 13 making up the feeding path portion is connected to AF coil part 111 by soldering at the tying part provided in magnet holder 12a.

Lower leaf spring 14 is fixed to the surface (rear surface) of magnet holder 12a on the −side in the Z direction on the outside, and fixed to the surface (rear surface) of lens holder 110 on the −side in the Z direction on the inside. The arm part extending in the intermediate part between the outside and inside in lower leaf spring 14 is elastically-deformable, and thus the inner portion of lower leaf spring 14 is relatively displaceable in the Z direction with respect to the outer portion of lower leaf spring 14.

For the specific configuration of the AF supporting part, the publicly known technique disclosed in PTL 3 and the like may be employed as necessary, and therefore the description thereof is omitted here, for example.

OIS Fixing Part

With suspension wire 30, OIS fixing part 20 supports OIS movable part 10 such that movable part 10 is swayable in the optical axis orthogonal direction. OIS fixing part 20 includes OIS coil part 22, magnetic sensor part 23, protection member 24, base member 25, and wiring member 27.

OIS Coil Part

OIS fixing part 20 includes OIS coil part 22 at the positions of the four corners opposite to magnet part 125 in the Z direction (optical axis direction). OIS coil part 22 is a coil that is energized at the time of shake correction. OIS coil part 22 includes four OIS coils 22A to 22D corresponding to permanent magnets 125A to 125D. In the present embodiment, OIS coils 22A to 22D are air-core coils.

Figure 13:
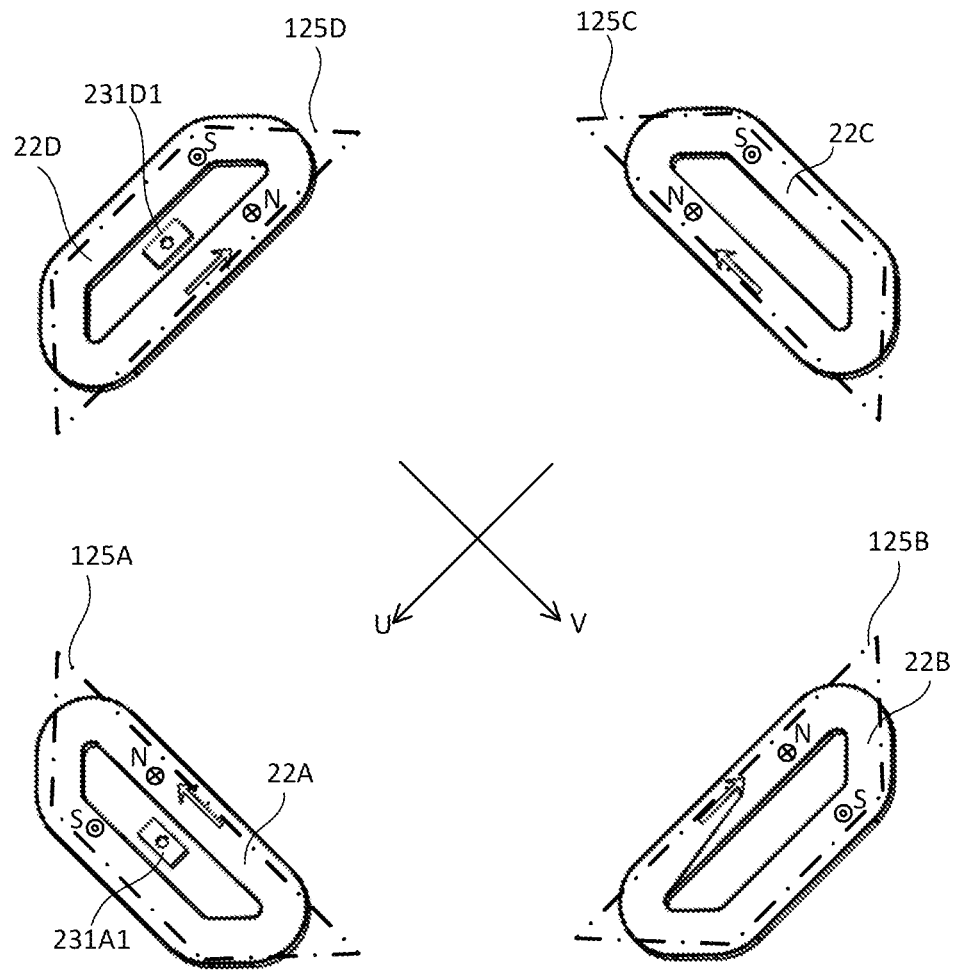
FIG. 13 is a diagram for describing a driving principle of an OIS driving part in the optical element driving apparatus illustrated in FIG. 5.
Figure 13:
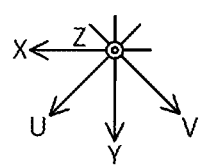

The sizes and arrangement of OIS coils 22A to 22D and permanent magnets 125A to 125D are set such that the magnetic fields radiated from the bottom surfaces of permanent magnets 125A to 125D cross the long sides of OIS coils 22A to 22D in the Z direction (see FIG. 13). The combination of magnet part 125 and OIS coil part 22 makes up the OIS voice coil motor (OIS driving part).

The end portion of the lead provided at both ends of each of OIS coils 22A to 22D is connected by soldering to coil terminal element 27a1 (an example of the coil terminal) of wiring member 27 provided in base member 25. That is, in the present embodiment, each of OIS coils 22A to 22D is directly connected to coil terminal element 27a1 without no substrate therebetween. Base member 25 is provided with coil recesses (an example of the second recess) 252A to 252D for disposing OIS coils 22A to 22D, and OIS coils 22A to 22D are disposed at coil recesses 252A to 252D of the four corners, respectively. The arrangement of OIS coils 22A to 22D at base member 25 and the like are elaborated later.

Magnetic Sensor Part

OIS fixing part 20 includes magnetic sensor part 23 in the center hollow parts of corresponding OIS coils 22A and 22D at the first corner part and the fourth corner part of the four corners. Magnetic sensor part 23 detects the position of OIS movable part 10 in the optical axis orthogonal plane on the basis of the relative positions of permanent magnets 125A and 125D and Hall elements 231A1 and 231D1 in the optical axis orthogonal plane that are specified by detecting the magnetic field formed by magnet part 125 (permanent magnets 125A and 125D) by using Hall elements 231A1 and 231D1. Magnetic sensor part 23 includes Hall element chip assemblies 231A and 231D. Hall element chip assemblies 231A and 231D include Hall elements 231A1 and 231D1 (an example of the magnetic sensor), and magnetic sensor substrates 231A2 and 231D2 where the chips of Hall elements 231A1 and 231D1 are mounted. Magnetic sensor substrates 231A2 and 231D2 are printed wiring boards (PWB), for example.

Hall elements 231A1 and 231D1 are provided at the center portions of the main surfaces of magnetic sensor substrates 231A2 and 231D2, and a substrate side terminal part is provided at the peripheral part thereof. The substrate side terminal part is connected by soldering to substrate terminal element 27b1 (an example of the substrate terminal) of wiring member 27 provided in base member 25. Specifically, in the present embodiment, Hall elements 231A1 and 231D1 are connected to substrate terminal element 27b1 through magnetic sensor substrates 231A2 and 231D2. Base member 25 is provided with substrate recesses (an example of the first recess) 254A and 254D for disposing Hall element chip assemblies 231A and 231D, and Hall element chip assemblies 231A and 231D are disposed to substrate recesses 254A and 254D of the four corners, respectively. The installation of Hall element chip assemblies 231A and 231D to base member 25 and the like are elaborated later.

Base Member

Base member 25 is a member with a square shape in plan view including center opening 250 where the optical path or the optical axis passes. Base member 25 is composed of a non-conductive material such as a synthetic resin, e.g., liquid crystal polymer (LCP). Wiring member 27 is insert-molded in base member 25. Here, wiring member 27 is described with reference to FIG. 9. FIG. 9 is a diagram for describing a wiring in OIS fixing part 20.

Wiring member 27 is a plate-shaped metal member insert-molded in base member 25. Wiring member 27 is composed of a conductive material such as beryllium copper, nickel copper, and stainless-steel.

Wiring member 27 includes coil terminal member 27a, substrate terminal member 27b, and wire terminal member 27c.

Coil terminal member 27a includes coil terminal element 27a1, and coil terminal connecting part 27a2. Coil terminal element 27a1 is disposed to be exposed upward at the bottom parts of coil recesses 252A to 252D provided in base member 25, and directly connected by soldering to the leads of OIS coils 22A to 22D disposed in coil recesses 252A to 252D. Coil terminal connecting part 27a2, protruding from the outer edge of base member 25, can be connected to image sensor substrate 501 on the outside. In coil terminal member 27a, the portions other than the portion exposed or protruded from base member 25 are embedded inside base member 25.

Substrate terminal member 27b includes substrate terminal element 27b1, and substrate terminal connecting part 27b2. Substrate terminal element 27b1 is disposed to be exposed upward at the bottom parts of substrate recesses 254A and 254D provided in base member 25, and is directly connected by soldering to the substrate side terminal part of Hall element chip assemblies 231A and 231D disposed in substrate recesses 254A and 254D. Substrate terminal connecting part 27b2, protruding from the outer edge of base member 25, can be connected to image sensor substrate 501 on the outside. In substrate terminal member 27b, the portions other than the portion exposed or protruded from base member 25 are embedded inside base member 25.

Wire terminal member 27c includes wire terminal element 27c1, and wire terminal connecting part 27c2. Wire terminal element 27c1 is disposed to be exposed upward and downward at the four corners of base member 25, and is directly connected by soldering to the lower end of suspension wire 30 inserted in the insertion hole formed in itself. Wire terminal connecting part 27c2, protruding from the outer edge of base member 25, can be connected to image sensor substrate 501 on the outside. In wire terminal member 27c, the portions other than the portion exposed or protruded from base member 25 are embedded inside base member 25.

Protection Member

Protection member 24 is provided so as to cover the region surrounding center opening 250 in base member 25. Protection member 24 is a thin plate member or a film member composed of a non-conductive material such as a resin material. To completely cover the installation regions of OIS coils 22A to 22D, protection member 24 is interposed between OIS coils 22A to 22D and permanent magnets 125A to 125D in the Z direction. Thus, OIS coils 22A to 22D and permanent magnets 125A to 125D can be prevented from colliding with each other as a result of an external shock. In addition, occurrence of short circuit due to the contact between OIS coils 22A to 22D made of metal and lower leaf spring 14 made of metal can be prevented. In base member 25, the apexes of columnar parts 256A to 256D and top surface 258 (the apexes of columnar parts 256A to 256D and top surface 258 may be collectively referred to as "main surface") serve as the placing surface of protection member 24. On top surface 258 making up the placing surface of protection member 24, boss 2581 serving as a mechanism for limiting the displacement (positional displacement) of mounted protection member 24 is formed at each of the four sides of base member 25. In the configuration illustrated in FIG. 7, with hole 24B for passing boss 2581 and notch part 24A for fitting boss 2581 formed in protection member 24, the displacement (positional displacement) of protection member 24 mounted on base member 25 can be limited.

Figure 16:
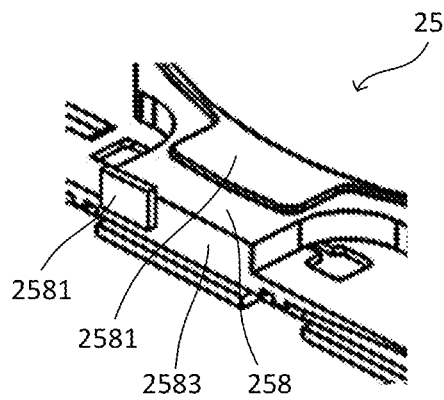
FIG. 16 is a diagram illustrating a modification of a displacement restriction mechanism in the protection member in the optical element driving apparatus illustrated in FIG. 5.

Here, as illustrated in FIG. 16 illustrating an enlarged view of the R portion surrounded with the broken line circle in FIG. 10, boss 2581 protruding upward from top surface 258 may be provided on outer peripheral surface 2583 of base member 25. Note that in the case where the modification illustrated in FIG. 16 is applied, boss 2581 is provided at each of the four sides of base member 25. In this case, the area of the flat portion in the placing surface of protection member 24 can be ensured more by eliminating all of columnar shape bosses 2581 illustrated in FIG. 10 and the like, and the configuration of protection member 241 can be simplified by forming notch part 241A for fitting boss 2581 in protection member 241 while eliminating the through hole for passing the boss as in a modification illustrated in FIG. 17.

Figure 17:
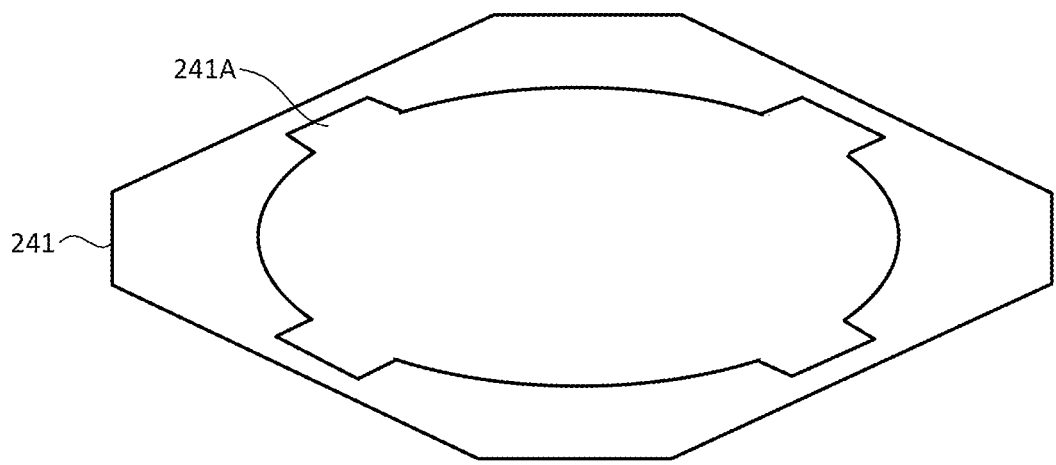
FIG. 17 is a diagram illustrating a modification of the protection member in the optical element driving apparatus illustrated in FIG. 5.

In addition, as illustrated in FIG. 17, protection member 241 may be composed of one plate or film with a shape matching the shape of base member 25 surrounding center opening 250. Since protection members 24 and 241 are thin and flexible, one annular protection member 241 is less twisted and is easier to handle during the mounting operation, and can advantageously enhance the efficiency of the mounting operation than two arc-like protection members 24.

Note that in the present embodiment, protection member 24 has a shape and a dimension that can completely cover the installation region of OIS coils 22A to 22D, but it may not completely cover the installation region of OIS coils 22A to 22D. For example, in the case where the short circuit due to the contact with lower leaf spring 14 need only be prevented, it is possible to cover only the region overlapping the movement range of lower leaf spring 14 in the installation region of OIS coils 22A to 22D as with protection member 242 (another modification of protection member 24) whose outline is schematically illustrated with the chain double-dashed line in FIG. 11B. In this case, the placement state of protection member 242 can be easily stabilized by covering columnar parts 256 provided inside the coil openings of OIS coils 22A to 22D. In addition, regarding columnar parts 256A and 256D where magnetic sensor substrates 231A2 and 231D2 are disposed in columnar parts 256 at the four corners (see FIG. 10), protection member 242 can also cover magnetic sensor substrates 231A2 and 231D2, and thus not only OIS coils 22A and 22D but also magnetic sensor substrates 231A2 and 231D2 can be protected. In addition, protection member 242 may be composed of one annular plate or film as in the above-described modification, i.e., protection member 241.

Structure of Four-Corner Column Part of Base Member

Now, a structure of the four corners of base member 25 is described below. FIGS. 11A and 11B are a side view and a plan view for describing a structure of four-corner column part 259 of base member 25 in optical element driving apparatus 1.

Base member 25 includes bottom part 257 with a square shape plan view located on the −side in the Z direction (optical axis direction imaging side) with respect to OIS movable part 10, and four-corner column part 259 extending to the +side in the Z direction (optical axis direction light reception side) from the four corners of bottom part 257. The surface of bottom part 257 on the +side in the Z direction (optical axis direction light reception side) is top surface 258 facing OIS movable part 10 and serving as the placing surface of protection member 24. Four-corner column part 259 is disposed upright from bottom part 257 with a height higher than the height position of top surface 258.

Four-corner column part 259 includes inner column part 2591 located relatively radially inside and outer column part 2592 located relatively radially outside. Inner column part 2591 includes, on the radially inside, movable part opposing surface 2591a that faces the outer periphery part of OIS movable part 10, or more specifically the outer peripheral surface of magnet holder 12a. Movable part opposing surface 2591a makes contact with the outer peripheral surface of magnet holder 12a when OIS movable part 10 moves in the optical axis orthogonal direction, and thus functions as a stopper capable of limiting the radial movement of OIS movable part 10. Outer column part 2592 includes, on the radially outside, cover opposing surface 2592a, such as a bonding surface to the inner peripheral surface of cover 3, where cover 3 is attachable when cover 3 is attached to optical element driving apparatus 1.

For both movable part opposing surface 2591a of inner column part 2591 functioning as the stopper, and cover opposing surface 2592a of outer column part 2592 functioning as the bonding surface, the greater the opposing area with the opposite part, the more preferable to ensure the function. Therefore, for both inner column part 2591 and outer column part 2592, it is desirable to increase the height as much as possible without preventing the low profile of optical element driving apparatus 1. In addition, regarding the function of four-corner column part 259 serving as a stopper, it is desirable to suppress the impact applied to magnet holder 12a when making contact with magnet holder 12a as much as possible. In view of this, in the present embodiment, four-corner column part 259 is provided with separation groove 2593 that separates four-corner column part 259, especially the apex of four-corner column part 259, into the inside (inner column part 2591) and the outside (outer column part 2592) in the radial direction. In this manner, a structure in which at least the apex of four-corner column part 259 is divided into the inside and the outside is achieved, and inner column part 2591 can be thinned in the radial direction, thus providing flexibility to inner column part 2591, albeit slightly. In this manner, the impact applied to magnet holder 12a at the time of the contact with magnet holder 12a is eased. The position where separation groove 2593 is formed is a position where radial dimension d1 of inner column part 2591 is smaller than radial dimension d2 of outer column part 2592, for example. The smaller the radial dimension d1 of inner column part 2591, the greater flexibility of inner column part 2591 can be expected.

Detailed Configuration

Other detailed configurations in OIS fixing part 20 are not elaborated here, but the publicly known techniques disclosed in PTL 3 and the like may be employed as necessary, for example.

Operation of Optical Element Driving Apparatus

FIGS. 12 and 13 are diagrams for describing driving principles of the AF driving part (AF voice coil motor) and the OIS driving part (OIS voice coil motor) in optical element driving apparatus 1.

When automatic focusing is performed in optical element driving apparatus 1, AF coil part 111 is energized. When AF coil part 111 is energized, a Lorentz force is generated in AF coil part 111 by the interaction of the magnetic field of magnet part 125 and the current flowing through AF coil part 111 (Fleming's left hand rule). The direction of the Lorentz force in this case is the direction (i.e., the Z direction (optical axis direction)) orthogonal to the direction of the magnetic field (the direction toward the radially inside, see FIG. 12) and the direction of the current flowing through AF coil part 111 (the circumferential direction, see FIG. 12). Since magnet part 125 (permanent magnets 125A to 125D) is fixed, a reactive force acts on AF coil part 111. With this reactive force serving as the driving force of the AF voice coil motor (AF driving part), AF movable part 11 including AF coil part 111 moves in the Z direction (optical axis direction), and thus focusing is performed.

When shake correction is performed in optical element driving apparatus 1, OIS coils 22A to 22D are energized. When OIS coils 22A to 22D are energized, a Lorentz force is generated in OIS coils 22A to 22D by the interaction of the magnetic field of magnet part 125 and the current flowing through OIS coils 22A to 22D (Fleming's left hand rule). The direction of the Lorentz force in this case is the direction (i.e., the V direction or the U direction) orthogonal to the direction (Z direction (optical axis direction), see FIG. 13) of the magnetic field at the long side portions of OIS coils 22A to 22D, and the direction of the current (the U direction or the V direction, see FIG. 13). Since OIS coils 22A to 22D are fixed, a reactive force acts on permanent magnets 125A to 125D. With this reactive force serving as the driving force of OIS voice coil motor (OIS driving part), OIS movable part 10 including magnet part 125 sways in the optical axis orthogonal plane, and thus shake correction is performed.

Figure 14A:
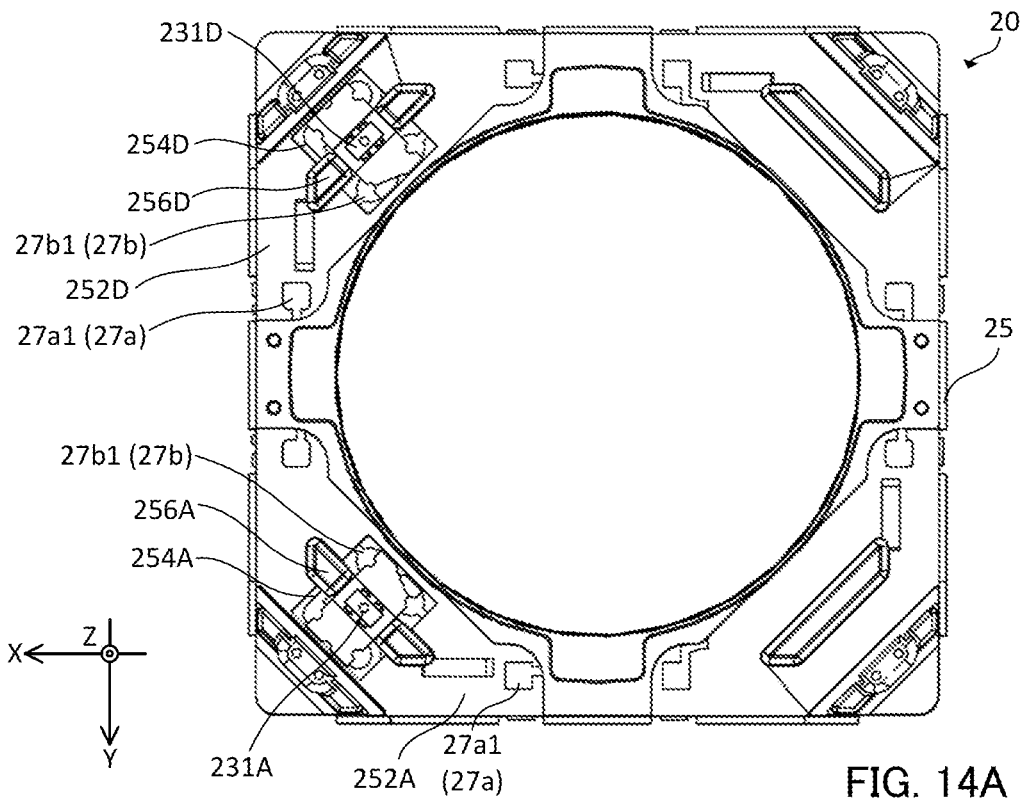
FIG. 14A is a plan view illustrating a state where a Hall element chip assembly is attached to the base member illustrated in FIG. 10.
Figure 14B:
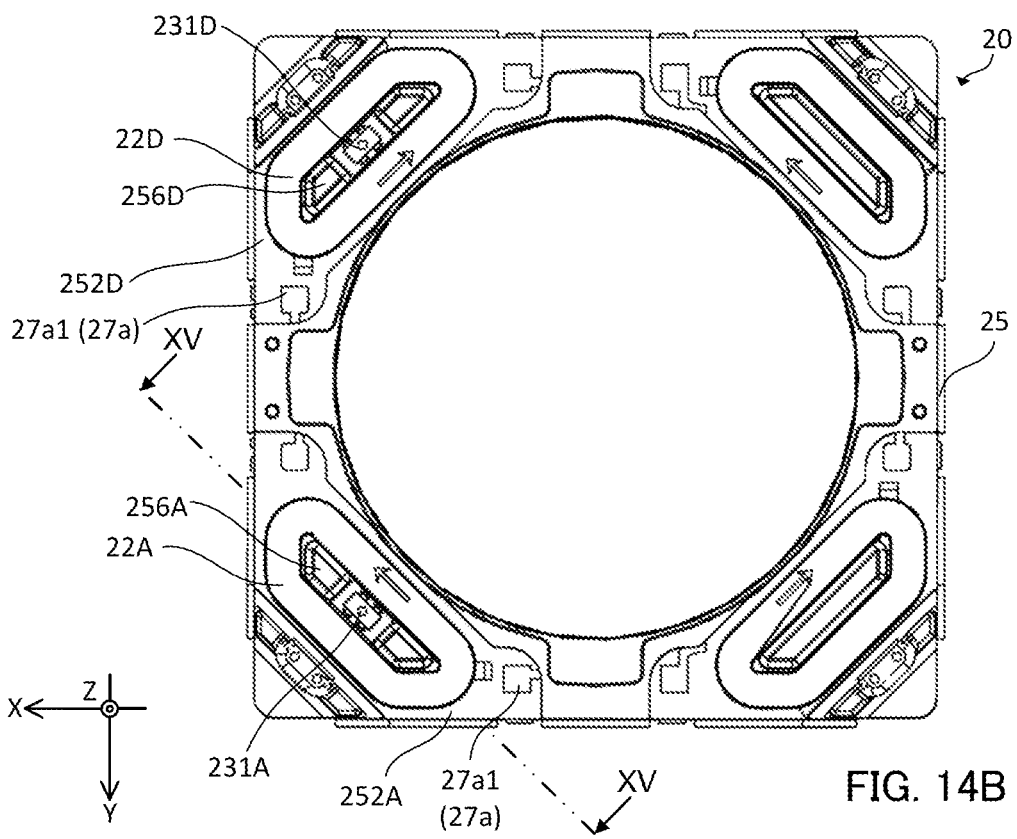
FIG. 14B is a plan view illustrating a state where an OIS coil is further attached in the state illustrated in FIG. 14A.
Figure 15:
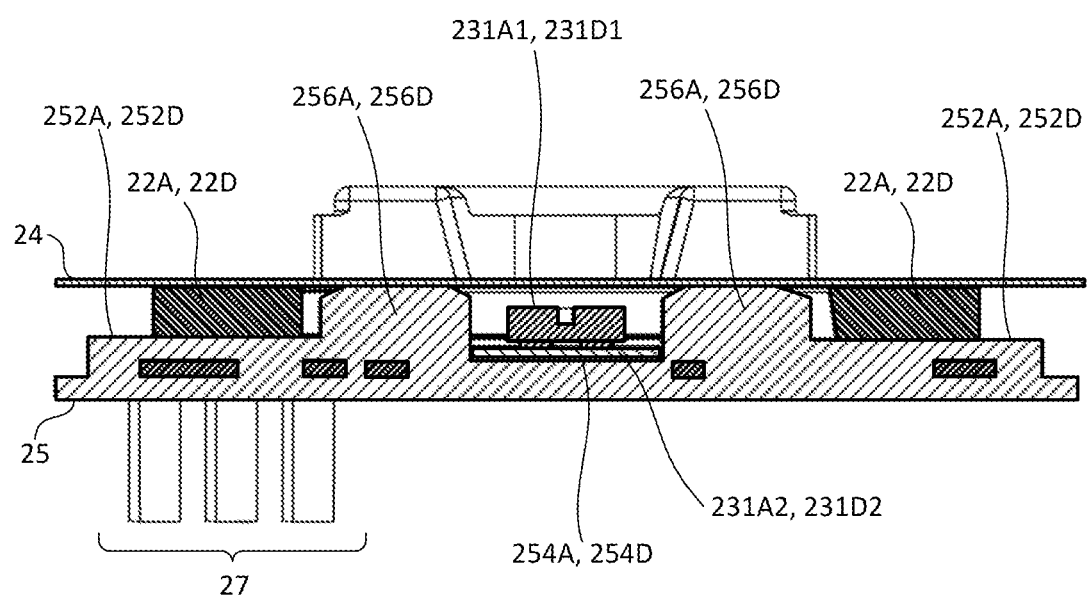
FIG. 15 is a sectional view taken along line XV-XV illustrating a state where the protection member illustrated in FIG. 7 is further attached in the state illustrated in FIG. 14B.

Installation of Magnetic Sensor Part and OIS Coil Part to Base Member in OIS Fixing Part Next, installation of the magnetic sensor part and the OIS coil part base member 25 of OIS fixing part 20 is described with reference to FIGS. 10, 14, and 15. FIG. 10 is an exploded perspective view as viewed from above illustrating a state where Hall element chip assemblies 231A and 231D and OIS coils 22A to 22D are detached from base member 25 in OIS fixing part 20. FIG. 14A is a plan view illustrating a state where Hall element chip assemblies 231A and 231D are attached to base member 25, and FIG. 14B is a plan view illustrating a state where OIS coils 22A to 22D are further attached in the state illustrated in FIG. 14A. FIG. 15 is a sectional view taken along line XV-XV illustrating a state where protection member 24 is further attached in the state illustrated in FIG. 14B.

Substrate recesses 254A and 254D and coil recesses 252A, 252B, 252C and 252D are formed in base member 25 where Hall element chip assemblies 231A and 231D and OIS coils 22A to 22D are disposed.

Coil recesses 252A to 252D are formed radially inside the position where suspension wire 30 is disposed and radially outside the position of center opening 250 at the four corners of base member 25. The shapes of coil recesses 252A to 252D are recesses formed with an annular shape with the center columnar parts 256A, 256B, 256C and 256D left along the oval loop form of OIS coils 22A to 22D as the air-core coils. Columnar parts 256A to 256D function as positioning members in installation of OIS coils 22A to 22D. Note that the apexes of columnar parts 256A to 256D are substantially flush with the surface (top surface 258 of base member 25) surrounding the upper edge of center opening 250. Thus, the apexes of columnar parts 256A to 256D and top surface 258 in base member 25 function as the placing surface of protection member 24.

In coil recesses 252A and 252D located at the first corner part and the fourth corner part among coil recesses 252A to 252D, substrate recesses 254A and 254D further recessed from the bottom parts of coil recesses 252A and 252D are formed in a manner radially crossing columnar parts 256A and 256D. The shape of substrate recesses 254A and 254D is a recess with a rectangular shape in plan view in a manner along the external shape of magnetic sensor substrates 231A2 and 231D2 of Hall element chip assemblies 231A and 231D with a rectangular shape in plan view. Note that substrate recesses 254A and 254D have a shape slightly constricted at the portion intersecting columnar parts 256A and 256D. In other words, a pair of columns making up columnar parts 256A and 256D partially reduces the width of substrate recesses 254A and 254D interposed therebetween. With such a shape, columnar parts 256A and 256D function as positioning members when disposing Hall element chip assemblies 231A and 231D to substrate recesses 254A and 254D.

In the operation of assembling Hall element chip assemblies 231A and 231D and OIS coils 22A to 22D to base member 25, first, Hall element chip assemblies 231A and 231D are disposed to substrate recesses 254A and 254D (see FIG. 14A), and the substrate side terminals of magnetic sensor substrates 231A2 and 231D2 are joined by soldering to substrate terminal element 27b1 exposed upward at the bottom part of substrate recesses 254A and 254D. Then, OIS coils 22A to 22D are disposed to coil recesses 252A to 252D (see FIG. 14B), and the ends of the leads of OIS coils 22A to 22D on both sides in the longitudinal direction are joined by soldering to coil terminal element 27a1 exposed upward at the bottom parts of the both end portions of coil recesses 252A to 252D.

Specifically, substrate terminal element 27b1 directly connected to magnetic sensor substrates 231A2 and 231D2 in OIS fixing part 20 (base member 25) is disposed in an exposed manner at substrate recesses 254A and 254D formed at the centers of the bottom parts of coil recesses 252A and 252D. In addition, coil terminal element 27a1 directly connected to OIS coils 22A and 22D in OIS fixing part 20 (base member 25) is provided in an exposed manner at the both ends of the bottom parts of coil recesses 252A and 252D. In this manner, substrate terminal element 27b1 and coil terminal element 27a1 are disposed in the bottom part region of coil recesses 252A and 252D, but their positions are separated from each other. Thus, soldering operation can be easily performed.

Note that the first step of the assembling operation may be executed in the following procedure. First, magnetic sensor substrates 231A2 and 231D2 where Hall elements 231A1 and 231D1 are not mounted are disposed to substrate recesses 254A and 254D, and the substrate side terminal located at the outer edges of magnetic sensor substrates 231A2 and 231D2 is joined by soldering to substrate terminal element 27b1. Next, Hall elements 231A1 and 231D1 are mounted to the Hall element mounting surface located at the center of magnetic sensor substrates 231A2 and 231D2. In this manner, even through the procedure of separately mounting magnetic sensor substrates 231A2 and 231D2 and Hall elements 231A1 and 231D1, the operation can be proceeded after magnetic sensor substrates 231A2 and 231D2 are disposed to substrate recesses 254A and 254D, and thus the high accuracy of the positioning accuracy can be maintained.

The sectional view of FIG. 15 illustrates a state where the operation of assembling Hall element chip assemblies 231A and 231D and OIS coils 22A to 22D to base member 25 has been completed and further the operation of attaching protection member 24 has been completed.

The depth of substrate recesses 254A and 254D formed in a part of the bottom parts of coil recesses 252A and 252D as illustrated in FIGS. 14A and 14B is a depth greater than the thickness of magnetic sensor substrates 231A2 and 231D2 as illustrated in FIG. 15. As such, in comparison with the case where the Hall element is not mounted to the substrate but is used alone, the thickness is increased by magnetic sensor substrates 231A2 and 231D2 used; however, the increase is offset by the depth of substrate recesses 254A and 254D, and thus the thinning of base member 25 is not affected. In addition, since magnetic sensor substrates 231A2 and 231D2 that are not completely housed in substrate recesses 254A and 254D can be prevented from protruding from substrate recesses 254A and 254D, magnetic sensor substrates 231A2 and 231D2 do not hinder the installation of OIS coils 22A and 22D to coil recesses 252A and 252D regardless of the planer sizes of magnetic sensor substrates 231A2 and 231D2.

Further, the depth of substrate recesses 254A and 254D is a depth with which when magnetic sensor substrates 231A2 and 231D2 are housed, the optical axis direction light reception side end portion of Hall elements 231A and 231D on magnetic sensor substrates 231A2 and 231D2 is at the same position as the optical axis direction light reception side end portion of OIS coils 22A and 22D on the bottom part of coil recesses 252A and 252D. Alternatively, the depth of substrate recesses 254A and 254D is a depth with which when magnetic sensor substrates 231A2 and 231D2 are housed, the optical axis direction light reception side end portion of Hall elements 231A and 231D of magnetic sensor substrates 231A2 and 231D2 is displaced to the optical axis direction imaging side than the same position as the optical axis direction light reception side end portion of OIS coils 22A and 22D on the bottom part of coil recesses 252A and 252D (see FIG. 15). In this manner, the optical axis direction light reception side end portion of Hall elements 231A1 and 231D1 can be prevented from protruding to the position higher than the optical axis direction light reception side end portion of OIS coils 22A and 22D, and thus base member 25 can be more reliably thinned. In short, the installation of magnetic sensor substrates 231A2 and 231D2 and OIS coils 22A and 22D overlapping in the Z direction can be achieved, and thus the apparatus size can be minimized.

In addition, as illustrated in FIGS. 14A and 14B, OIS coils 22A and 22D are air-core coils provided at the bottom parts of coil recesses 252A and 252D in a crossing manner across substrate recesses 254A and 254D. Therefore, in comparison with a virtual case where a sheet type coil such as a coil substrate is provided in a crossing manner at the bottom parts of coil recesses 252A and 252D, the posture of the OIS coils 22A and 22D can be stabilized, and thus the increase in the plan area of base member 25, and in turn the increase in the size of optical element driving apparatus 1, can be suppressed.

As described above, according to the present embodiment, optical element driving apparatus 1 includes: OIS coils 22A and 22D and permanent magnets 125A and 125D that are separately provided to OIS movable part 10 configured to hold lens part 2 and OIS fixing part 20 configured to support OIS movable part 10, and operate in conjunction to move OIS movable part 10 with respect to OIS fixing part 20; and Hall elements 231A1 and 231D1 that detect the position of OIS movable part 10 based on the relative position with respect to permanent magnets 125A and 125D. Hall elements 231A1 and 231D1 are mounted to magnetic sensor substrates 231A2 and 231D2, and magnetic sensor substrates 231A2 and 231D2 are housed in the recess provided in OIS fixing part 20. In this manner, even with an arrangement with Hall elements 231A1 and 231D1 mounted to magnetic sensor substrates 231A2 and 231D2, the increase in volume of OIS fixing part 20 can be suppressed, and thus the increase in the apparatus size of optical element driving apparatus 1 can be suppressed. In addition, Hall elements 231A1 and 231D1 are not used alone but are mounted to OIS fixing part 20 through magnetic sensor substrates 231A2 and 231D2. Thus, it is not difficult to confirm the mounting state of Hall elements 231A1 and 231D1 and the connection state of wiring member 27, and the attaching accuracy of Hall elements 231A1 and 231D1 can be improved.

In addition, OIS fixing part 20 includes base member 25 integrally including substrate terminal element 27b1 directly connected to magnetic sensor substrates 231A2 and 231D2 and coil terminal element 27a1 directly connected to OIS coils 22A to 22D. In this manner, it is only necessary to separately connect Hall elements 231A1 and 231D1 and OIS coils 22A to 22D, and thus magnetic sensor substrates 231A2 and 231D2 can be used as substrates dedicated to mount Hall elements 231A1 and 231D1. Thus, the sizes of magnetic sensor substrates 231A2 and 231D2 can be significantly reduced, and the size of the entire apparatus can be further reduced.

The above is a specific description of the embodiments of the invention, but the invention is not limited to the specific embodiments described above. Within the scope of the gist of the invention described in the claims, various variations and changes to the specific examples described in the above embodiments are possible.

INDUSTRIAL APPLICABILITY

The optical element driving apparatus and the camera module according to the present invention can be usefully mounted in camera-equipped apparatuses such as smart-phones, mobile phones, digital cameras, note-type personal computers, tablet terminals, mobile game machines, in-vehicle cameras, and drones.

REFERENCE SIGNS LIST

A Camera module
M Smartphone
OC Back surface camera
V Automobile
VC In-vehicle camera
1 Optical element driving apparatus
2 Lens part
3 Cover
301 Opening
5 Image-capturing part
501 Image sensor substrate
502 Imaging element
503 Control part
10 OIS movable part
11 AF movable part
110 Lens holder
110a Lens housing part
110a1 Lens housing opening
111 AF coil part
12 AF fixing part
12a Magnet holder
125 Magnet part
125A, 125B, 125C, 125D Permanent magnet
13 Upper elastic support part (Upper leaf spring)
131 Wire fixing part
131a Slit
14 Lower elastic support part (Lower leaf spring)
20 OIS fixing part
22 OIS coil part
22A, 22B, 22D, 22D OIS coil
23 Magnetic sensor part
231A, 231D Hall element chip assembly
231A1, 231D1 Hall element
231A2, 231D2 Magnetic sensor substrate
24, 241, 242 Protection member
24A, 241A Notch part
24B Through hole
25 Base member
250 Center opening
252, 252A, 252B, 252C, 252D Coil recess (Second recess)
254A, 254D Substrate recess (First recess)
256, 256A, 256B, 256C, 256D Columnar part
257 Bottom part
258 Top surface
2581 Boss
2583 Outer peripheral surface
259 Four-corner column part
2591 Inner column part
2591a OIS movable part opposing surface
2592 Outer column part
2592a Cover opposing surface
2593 Separation groove
27 Wiring member
27a Coil terminal member
27a1 Coil terminal element
27a2 Coil terminal connecting part
27b Substrate terminal member
27b1 Substrate terminal element
27b2 Substrate terminal connecting part
27c Wire terminal member 27*cl* Wire terminal element
27*c*2 Wire terminal connecting part
30 OIS supporting part (Suspension wire)

What is claimed is:

1. An optical element driving apparatus, comprising:
   a coil and a magnet separately disposed at a movable part configured to hold an optical element and a fixing part configured to support the movable part, the coil and the magnet being configured to operate in conjunction with each other to move the movable part with respect to the fixing part; and
   a magnetic sensor mounted on a magnetic sensor substrate and configured to detect a position of the movable part based on a relative position with respect to the magnet, wherein:
   the fixing part is provided with a first recess and a second recess configured to house the magnetic sensor substrate and the coil, respectively, and
   the first recess is formed in a part of a bottom part of the second recess with a depth equal to or greater than a thickness of the magnetic sensor substrate.

2. The optical element driving apparatus according to claim 1, wherein the fixing part includes a base member integrally including a substrate terminal directly connected to the magnetic sensor substrate and a coil terminal directly connected to the coil.

3. The optical element driving apparatus according to claim 1, wherein a substrate terminal directly connected to the magnetic sensor substrate in the fixing part is provided to be exposed at the first recess formed at a center of the bottom part of the second recess, and a coil terminal directly connected to the coil in the fixing part is provided to be exposed at both ends of the bottom part of the second recess.

4. The optical element driving apparatus according to claim 1, wherein:
   the fixing part includes a pair of columnar parts at both sides of the first recess, the columnar parts protruding from the bottom part of the second recess to an optical axis direction light reception side, and
   an optical axis direction light reception side end portion of the magnetic sensor on the magnetic sensor substrate housed in the first recess is at the same position as apexes of the columnar parts, or at a position displaced to an optical axis direction imaging side than the same position as the apexes.

5. The optical element driving apparatus according to claim 1, wherein a depth of the first recess is a depth with which an optical axis direction light reception side end portion of the magnetic sensor on the magnetic sensor substrate housed in the first recess is at the same position as an optical axis direction light reception side end portion of the coil housed in the second recess, or at a position displaced to an optical axis direction imaging side than the same position as the optical axis direction light reception side end portion.

6. The optical element driving apparatus according to claim 1, wherein the coil is an air-core coil provided at the bottom part of the second recess in a crossing manner across the first recess.

7. The optical element driving apparatus according to claim 1,
   wherein the fixing part includes a bottom part located on an optical axis direction imaging side with respect to the movable part, and a column part extending from the bottom part of the fixing part to an optical axis direction light reception side, the column part forming an opposing surface facing the movable part from outside in a radial direction, and
   wherein the column part includes an inner column part including the opposing surface, and an outer column part separated by a groove from the inner column part.

8. The optical element driving apparatus according to claim 7, wherein in the radial direction, a dimension of the inner column part is smaller than a dimension of the outer column part.

9. The optical element driving apparatus according to claim 1,
   wherein the fixing part includes:
      an inner column part disposed to face the movable part from outside in a radial direction and configured to limit a radial movement of the movable part, and
      an outer column part disposed on outside in the radial direction with respect to the inner column part and configured such that a cover of the optical element driving apparatus is attachable, and
   wherein the inner column part and the outer column part are separated from each other with a groove.

10. The optical element driving apparatus according to claim 1,
   wherein a protection member is provided in a main surface facing the movable part in the fixing part, the protection member being configured to at least partially cover the coil housed in the second recess to protect the coil from the movable part.

11. The optical element driving apparatus according to claim 10, wherein the protection member further at least partially covers the magnetic sensor substrate housed in the first recess to protect the magnetic sensor substrate from the movable part.

12. The optical element driving apparatus according to claim 10, wherein the fixing part includes a boss configured to limit displacement of the protection member provided in the main surface.

13. The optical element driving apparatus according to claim 10, wherein the protection member is a single plate or a single film with a shape matching a shape surrounding a center opening of the fixing part.

14. A camera module, comprising:
   the optical element driving apparatus according to claim 1;
   the optical element; and
   an image-capturing part configured to capture a subject image formed by the optical element.

15. A camera-equipped apparatus that is an information apparatus or a transport apparatus, the camera-equipped apparatus comprising:
   the camera module according to claim 14; and
   an image processing part configured to process image information obtained by the camera module.

* * * * *